(12) United States Patent
Sikchi et al.

(10) Patent No.: US 7,516,145 B2
(45) Date of Patent: Apr. 7, 2009

(54) SYSTEM AND METHOD FOR INCREMENTALLY TRANSFORMING AND RENDERING HIERARCHICAL DATA FILES

(75) Inventors: Prakash Sikchi, Issaquah, WA (US); Dragos Barac, Bellevue, WA (US); Ranjan Aggarwal, Redmond, WA (US); Stephen J. Mooney, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 452 days.

(21) Appl. No.: 10/404,312

(22) Filed: Mar. 31, 2003

(65) Prior Publication Data

US 2004/0193661 A1    Sep. 30, 2004

(51) Int. Cl.
*G06F 7/00* (2006.01)
(52) U.S. Cl. .................... 707/102; 707/205; 707/104.1; 715/224; 715/225; 715/226
(58) Field of Classification Search ............ 707/205, 707/102, 104.1; 719/762; 345/810; 715/513, 715/514
See application file for complete search history.

(56) References Cited

U.S. PATENT DOCUMENTS

| | | | |
|---|---|---|---|
| 4,201,978 A | 5/1980 | Nally | |
| 4,498,147 A | 2/1985 | Agnew et al. | |
| 4,514,800 A | 4/1985 | Gruner et al. | |
| 4,564,752 A | 1/1986 | Lepic et al. | |
| 4,641,274 A | 2/1987 | Swank | |
| 4,674,040 A | 6/1987 | Barker et al. | |
| 4,723,211 A | 2/1988 | Barker et al. | |
| 4,739,477 A | 4/1988 | Barker et al. | |
| 4,815,029 A | 3/1989 | Barker et al. | |
| 4,847,749 A | 7/1989 | Collins et al. | |
| 4,910,663 A | 3/1990 | Bailey | |
| 4,933,880 A | 6/1990 | Borgendale et al. | |
| 4,962,475 A | 10/1990 | Hernandez et al. | |
| 5,025,484 A | 6/1991 | Yamanari et al. | |
| 5,072,412 A | 12/1991 | Henderson, Jr. et al. | |
| 5,179,703 A | 1/1993 | Evans | |
| 5,182,709 A | 1/1993 | Makus | |

(Continued)

FOREIGN PATENT DOCUMENTS

EP    0 841 615 A2    5/1998

(Continued)

OTHER PUBLICATIONS

IBM Technical Disclosure Bulletin, "Stack Algorithm For Extracting Subtree from Serialized Tree", Mar. 1, 1994, TDB-ACC-NO NN94033, 3 pages.*

(Continued)

*Primary Examiner*—Hung T Vy
*Assistant Examiner*—Michael Le

(57) ABSTRACT

This document describes a system and method that incrementally transforms and renders changes to a hierarchical data file. This system and method allows a user to incrementally see changes that the user has made to the hierarchical data file through entry of data in a rendered form. A hierarchical data processing engine may perform partial transformations of data files and produce partial rendering files of changes made to data files. By so doing, the hierarchical data processing engine improves a user's editing experience by allowing for quicker updating of the rendered form being edited by the user.

53 Claims, 9 Drawing Sheets

U.S. PATENT DOCUMENTS

| | | |
|---|---|---|
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |
| 5,206,951 A | 4/1993 | Khoyi et al. |
| 5,218,672 A | 6/1993 | Morgan et al. |
| 5,220,649 A | 6/1993 | Forcier |
| 5,222,160 A | 6/1993 | Sakai et al. |
| 5,228,100 A | 7/1993 | Takeda et al. |
| 5,237,680 A | 8/1993 | Adams et al. |
| 5,249,275 A | 9/1993 | Srivastava |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffeman et al. |
| 5,381,547 A | 1/1995 | Flug et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,555,325 A | 9/1996 | Burger |
| 5,566,330 A | 10/1996 | Sheffield |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,600,789 A | 2/1997 | Parker et al. |
| 5,602,996 A | 2/1997 | Powers, III et al. |
| 5,608,720 A | 3/1997 | Biegel et al. |
| 5,625,783 A | 4/1997 | Ezekiel et al. |
| 5,627,979 A | 5/1997 | Chang et al. |
| 5,630,126 A | 5/1997 | Redpath |
| 5,634,121 A | 5/1997 | Tracz et al. |
| 5,634,124 A | 5/1997 | Khoyi et al. |
| 5,640,544 A | 6/1997 | Onodera et al. |
| 5,644,738 A | 7/1997 | Goldman et al. |
| 5,649,099 A | 7/1997 | Theimer et al. |
| 5,659,729 A | 8/1997 | Nielsen |
| 5,664,178 A | 9/1997 | Sinofsky |
| 5,668,966 A | 9/1997 | Ono et al. |
| 5,669,005 A | 9/1997 | Curbow et al. |
| 5,682,536 A | 10/1997 | Atkinson et al. |
| 5,689,667 A | 11/1997 | Kurtenbach |
| 5,689,703 A | 11/1997 | Atkinson et al. |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A | 4/1998 | Turpin et al. |
| 5,748,807 A | 5/1998 | Lopresti et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,790,796 A | 8/1998 | Sadowsky |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,854,630 A | 12/1998 | Nielsen |
| 5,859,973 A | 1/1999 | Carpenter et al. |
| 5,862,372 A | 1/1999 | Morris et al. |
| 5,862,379 A | 1/1999 | Rubin et al. |
| 5,864,819 A | 1/1999 | De Armas et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,922,072 A | 7/1999 | Hutchinson et al. |
| 5,928,363 A | 7/1999 | Ruvolo |
| 5,929,858 A | 7/1999 | Shibata et al. |
| 5,940,075 A | 8/1999 | Mutschler, III et al. |
| 5,950,010 A | 9/1999 | Hesse et al. |
| 5,956,481 A | 9/1999 | Walsh et al. |
| 5,960,199 A | 9/1999 | Brodsky et al. |
| 5,963,964 A | 10/1999 | Nielsen |
| 5,973,696 A | 10/1999 | Agranat et al. |
| 5,974,454 A | 10/1999 | Apfel et al. |
| 5,982,370 A | 11/1999 | Kamper |
| 5,983,348 A | 11/1999 | Ji |
| 5,987,480 A | 11/1999 | Donohue et al. |
| 5,991,710 A | 11/1999 | Papineni et al. |
| 5,991,731 A | 11/1999 | Colon et al. |
| 5,991,877 A | 11/1999 | Luckenbaugh |
| 5,995,103 A | 11/1999 | Ashe |
| 5,999,740 A | 12/1999 | Rowley |
| 6,005,570 A | 12/1999 | Gayraud et al. |
| 6,014,135 A | 1/2000 | Fernandes |
| 6,016,520 A | 1/2000 | Facq et al. |
| 6,018,743 A | 1/2000 | Xu |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,035,309 A | 3/2000 | Dauerer et al. |
| 6,044,205 A | 3/2000 | Reed et al. |
| 6,052,531 A | 4/2000 | Waldin et al. |
| 6,052,710 A | 4/2000 | Saliba et al. |
| 6,054,987 A | 4/2000 | Richardson |
| 6,070,184 A | 5/2000 | Blount et al. |

| | | | | | | |
|---|---|---|---|---|---|---|
| 6,072,870 | A | 6/2000 | Nguyen et al. | 6,369,840 | B1 | 4/2002 | Barnett et al. |
| 6,078,326 | A | 6/2000 | Kilmer et al. | 6,374,402 | B1 | 4/2002 | Schmeidler et al. |
| 6,078,327 | A | 6/2000 | Liman et al. | 6,381,742 | B2 | 4/2002 | Forbes et al. |
| 6,078,924 | A | 6/2000 | Ainsbury et al. | 6,381,743 | B1 | 4/2002 | Mutschler, III |
| 6,081,610 | A | 6/2000 | Dwork et al. | 6,389,434 | B1 | 5/2002 | Rivette et al. |
| 6,084,585 | A | 7/2000 | Kraft et al. | 6,393,456 | B1 | 5/2002 | Ambler et al. |
| 6,088,708 | A | 7/2000 | Burch et al. | 6,396,488 | B1 | 5/2002 | Simmons et al. |
| 6,091,417 | A | 7/2000 | Lefkowitz | 6,405,221 | B1 | 6/2002 | Levine et al. |
| 6,094,657 | A | 7/2000 | Hailpern et al. | 6,405,238 | B1 | 6/2002 | Votipka |
| 6,097,382 | A | 8/2000 | Rosen et al. | 6,408,311 | B1 | 6/2002 | Baisley et al. |
| 6,098,081 | A | 8/2000 | Heidorn et al. | 6,414,700 | B1 | 7/2002 | Kurtenbach et al. |
| 6,108,637 | A | 8/2000 | Blumenau | 6,421,070 | B1 | 7/2002 | Ramos et al. |
| 6,108,783 | A | 8/2000 | Krawczyk et al. | 6,421,656 | B1 | 7/2002 | Cheng et al. |
| 6,115,646 | A | 9/2000 | Fiszman et al. | 6,425,125 | B1 | 7/2002 | Fries et al. |
| 6,121,965 | A | 9/2000 | Kenney et al. | 6,429,885 | B1 | 8/2002 | Saib et al. |
| 6,122,647 | A | 9/2000 | Horowitz et al. | 6,434,563 | B1 | 8/2002 | Pasquali et al. |
| 6,144,969 | A | 11/2000 | Inokuchi et al. | 6,434,564 | B2 | 8/2002 | Ebert |
| 6,151,624 | A | 11/2000 | Teare et al. | 6,442,563 | B1 | 8/2002 | Bacon et al. |
| 6,154,128 | A | 11/2000 | Wookey et al. | 6,442,755 | B1 | 8/2002 | Lemmons et al. |
| 6,163,772 | A | 12/2000 | Kramer et al. | 6,446,110 | B1 | 9/2002 | Lection et al. |
| 6,167,521 | A | 12/2000 | Smith et al. | 6,449,617 | B1 | 9/2002 | Quinn et al. |
| 6,167,523 | A | 12/2000 | Strong | 6,457,009 | B1 | 9/2002 | Bollay |
| 6,182,094 | B1 | 1/2001 | Humpleman et al. | 6,460,058 | B2 | 10/2002 | Koppolu et al. |
| 6,182,095 | B1 | 1/2001 | Leymaster et al. | 6,463,419 | B1 | 10/2002 | Kluss |
| 6,188,401 | B1 | 2/2001 | Peyer | 6,470,349 | B1 | 10/2002 | Heninger et al. |
| 6,191,797 | B1 | 2/2001 | Politis | 6,473,800 | B1 | 10/2002 | Jerger et al. |
| 6,192,367 | B1 | 2/2001 | Hawley et al. | 6,476,828 | B1 | 11/2002 | Burkett et al. |
| 6,195,661 | B1 | 2/2001 | Filepp et al. | 6,476,833 | B1 | 11/2002 | Moshfeghi |
| 6,199,204 | B1 | 3/2001 | Donohue | 6,477,544 | B1 | 11/2002 | Bolosky et al. |
| 6,209,128 | B1 | 3/2001 | Gerard et al. | 6,480,860 | B1 | 11/2002 | Monday |
| 6,216,152 | B1 | 4/2001 | Wong et al. | 6,487,566 | B1 | 11/2002 | Sundaresan |
| 6,219,698 | B1 | 4/2001 | Iannucci et al. | 6,490,601 | B1 | 12/2002 | Markus et al. |
| 6,225,996 | B1 | 5/2001 | Gibb et al. | 6,493,702 | B1 | 12/2002 | Adar et al. |
| 6,235,027 | B1 | 5/2001 | Herzon | 6,501,864 | B1 | 12/2002 | Eguchi et al. |
| 6,253,366 | B1 | 6/2001 | Mutschler, III | 6,502,101 | B1 * | 12/2002 | Verprauskus et al. ........ 707/101 |
| 6,253,374 | B1 | 6/2001 | Dresevic et al. | 6,502,103 | B1 | 12/2002 | Frey et al. |
| 6,263,313 | B1 | 7/2001 | Milsted et al. | 6,505,200 | B1 | 1/2003 | Ims et al. |
| 6,266,810 | B1 | 7/2001 | Tanaka et al. | 6,505,230 | B1 | 1/2003 | Mohan et al. |
| 6,268,852 | B1 | 7/2001 | Lindhorst et al. | 6,505,300 | B2 | 1/2003 | Chan et al. |
| 6,272,506 | B1 | 8/2001 | Bell | 6,507,856 | B1 | 1/2003 | Chen et al. |
| 6,275,227 | B1 | 8/2001 | DeStefano | 6,516,322 | B1 | 2/2003 | Meredith |
| 6,275,599 | B1 | 8/2001 | Adler et al. | 6,519,617 | B1 | 2/2003 | Wanderski et al. |
| 6,279,042 | B1 | 8/2001 | Ouchi | RE38,070 | E | 4/2003 | Spies et al. |
| 6,281,896 | B1 | 8/2001 | Alimpich et al. | 6,546,546 | B1 | 4/2003 | Van Doorn |
| 6,282,711 | B1 | 8/2001 | Halpern et al. | 6,549,221 | B1 | 4/2003 | Brown et al. |
| 6,286,033 | B1 | 9/2001 | Kishinsky et al. | 6,549,878 | B1 | 4/2003 | Lowry et al. |
| 6,292,897 | B1 | 9/2001 | Gennaro et al. | 6,549,922 | B1 | 4/2003 | Srivastava et al. |
| 6,297,819 | B1 | 10/2001 | Furst | 6,553,402 | B1 | 4/2003 | Makarios et al. |
| 6,300,948 | B1 | 10/2001 | Geller et al. | 6,560,616 | B1 | 5/2003 | Garber |
| 6,307,955 | B1 | 10/2001 | Zank et al. | 6,560,620 | B1 * | 5/2003 | Ching ........................ 715/511 |
| 6,308,179 | B1 | 10/2001 | Petersen et al. | 6,560,640 | B2 | 5/2003 | Smethers |
| 6,308,273 | B1 | 10/2001 | Goertzel et al. | 6,563,514 | B1 | 5/2003 | Samar |
| 6,311,271 | B1 | 10/2001 | Gennaro et al. | 6,571,253 | B1 | 5/2003 | Thompson et al. |
| 6,314,415 | B1 | 11/2001 | Mukherjee | 6,578,144 | B1 | 6/2003 | Gennaro et al. |
| 6,321,259 | B1 | 11/2001 | Ouellette et al. | 6,581,061 | B2 | 6/2003 | Graham |
| 6,321,334 | B1 | 11/2001 | Jerger et al. | 6,584,469 | B1 | 6/2003 | Chiang et al. |
| 6,327,628 | B1 | 12/2001 | Anuff et al. | 6,584,548 | B1 | 6/2003 | Bourne et al. |
| 6,331,864 | B1 | 12/2001 | Coco et al. | 6,585,778 | B1 | 7/2003 | Hind et al. |
| 6,343,149 | B1 | 1/2002 | Motoiwa | 6,589,290 | B1 | 7/2003 | Maxwell et al. |
| 6,343,302 | B1 | 1/2002 | Graham | 6,594,686 | B1 | 7/2003 | Edwards et al. |
| 6,345,256 | B1 | 2/2002 | Milsted et al. | 6,598,219 | B1 | 7/2003 | Lau |
| 6,345,278 | B1 | 2/2002 | Hitchcock et al. | 6,603,489 | B1 | 8/2003 | Edlund et al. |
| 6,345,361 | B1 | 2/2002 | Jerger et al. | 6,604,099 | B1 | 8/2003 | Chung et al. |
| 6,347,323 | B1 | 2/2002 | Garber et al. | 6,606,606 | B2 | 8/2003 | Starr |
| 6,349,408 | B1 | 2/2002 | Smith | 6,609,200 | B2 | 8/2003 | Anderson et al. |
| 6,351,574 | B1 | 2/2002 | Yair et al. | 6,611,822 | B1 | 8/2003 | Beams et al. |
| 6,353,851 | B1 | 3/2002 | Anupam et al. | 6,611,840 | B1 | 8/2003 | Baer et al. |
| 6,353,926 | B1 | 3/2002 | Parthesarathy et al. | 6,611,843 | B1 | 8/2003 | Jacobs |
| 6,356,906 | B1 | 3/2002 | Lippert et al. | 6,613,098 | B1 | 9/2003 | Sorge et al. |
| 6,357,038 | B1 | 3/2002 | Scouten | 6,615,276 | B1 | 9/2003 | Mastrianni et al. |
| 6,366,907 | B1 | 4/2002 | Fanning et al. | 6,629,109 | B1 | 9/2003 | Koshisaka |
| 6,366,912 | B1 | 4/2002 | Wallent et al. | 6,631,357 | B1 | 10/2003 | Perkowski |
| 6,367,013 | B1 | 4/2002 | Bisbee et al. | 6,631,379 | B2 | 10/2003 | Cox |

| | | |
|---|---|---|
| 6,631,497 B1 | 10/2003 | Jamshidi et al. |
| 6,631,519 B1 | 10/2003 | Nicholson et al. |
| 6,632,251 B1 | 10/2003 | Rutten et al. |
| 6,635,089 B1 | 10/2003 | Burkett et al. |
| 6,636,845 B2 | 10/2003 | Chau et al. |
| 6,643,633 B2 | 11/2003 | Chau et al. |
| 6,643,652 B2 | 11/2003 | Helgeson et al. |
| 6,643,684 B1 | 11/2003 | Malkin et al. |
| 6,651,217 B1 | 11/2003 | Kennedy et al. |
| 6,654,737 B1 | 11/2003 | Nunez |
| 6,654,932 B1 | 11/2003 | Bahrs et al. |
| 6,658,417 B1 | 12/2003 | Stakutis et al. |
| 6,658,622 B1 | 12/2003 | Aiken et al. |
| 6,661,920 B1 | 12/2003 | Skinner |
| 6,668,369 B1 | 12/2003 | Krebs et al. |
| 6,671,805 B1 | 12/2003 | Brown et al. |
| 6,675,202 B1 | 1/2004 | Perttunen |
| 6,678,717 B1 | 1/2004 | Schneider |
| 6,681,370 B2 | 1/2004 | Gounares et al. |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,701,486 B1 | 3/2004 | Weber et al. |
| 6,704,906 B1 | 3/2004 | Yankovich et al. |
| 6,711,679 B1 | 3/2004 | Guski et al. |
| 6,720,985 B1 | 4/2004 | Lapstun et al. |
| 6,725,426 B1 | 4/2004 | Pavlov |
| 6,728,755 B1 | 4/2004 | de Ment |
| 6,735,721 B1 | 5/2004 | Morrow et al. |
| 6,745,367 B1 | 6/2004 | Bates et al. |
| 6,748,385 B1 | 6/2004 | Rodkin et al. |
| 6,751,777 B2 | 6/2004 | Bates et al. |
| 6,754,874 B1 | 6/2004 | Richman |
| 6,757,826 B1 | 6/2004 | Paltenghe |
| 6,757,868 B1 | 6/2004 | Glaser et al. |
| 6,760,723 B2 | 7/2004 | Oshinsky et al. |
| 6,763,343 B1 | 7/2004 | Brooke et al. |
| 6,772,139 B1 | 8/2004 | Smith, III |
| 6,772,165 B2 | 8/2004 | O'Carroll |
| 6,774,926 B1 | 8/2004 | Ellis et al. |
| 6,779,154 B1 | 8/2004 | Nussbaum et al. |
| 6,781,609 B1 | 8/2004 | Barker et al. |
| 6,782,144 B2 | 8/2004 | Bellavita et al. |
| 6,799,299 B1 | 9/2004 | Li et al. |
| 6,801,929 B1 | 10/2004 | Donoho et al. |
| 6,816,849 B1 | 11/2004 | Halt, Jr. |
| 6,828,992 B1 | 12/2004 | Freeman et al. |
| 6,845,380 B2 * | 1/2005 | Su et al. ............ 707/102 |
| 6,847,387 B2 | 1/2005 | Roth |
| 6,848,078 B1 * | 1/2005 | Birsan et al. ......... 715/511 |
| 6,850,895 B2 | 2/2005 | Brodersen et al. |
| 6,871,220 B1 | 3/2005 | Rajan et al. |
| 6,874,130 B1 | 3/2005 | Baweja et al. |
| 6,876,996 B2 | 4/2005 | Czajkowski et al. |
| 6,889,359 B1 | 5/2005 | Conner et al. |
| 6,901,403 B1 | 5/2005 | Bata et al. |
| 6,915,454 B1 | 7/2005 | Moore et al. |
| 6,931,532 B1 * | 8/2005 | Davis et al. ......... 713/167 |
| 6,941,510 B1 | 9/2005 | Ozzie et al. |
| 6,941,511 B1 | 9/2005 | Hind et al. |
| 6,941,521 B2 | 9/2005 | Lin et al. |
| 6,948,129 B1 | 9/2005 | Loghmani |
| 6,948,133 B2 | 9/2005 | Haley |
| 6,948,135 B1 | 9/2005 | Ruthfield et al. |
| 6,950,980 B1 | 9/2005 | Malcolm |
| 6,961,897 B1 | 11/2005 | Peel, Jr. et al. |
| 6,963,875 B2 | 11/2005 | Moore |
| 6,968,503 B1 | 11/2005 | Chang et al. |
| 6,968,505 B2 | 11/2005 | Stoll et al. |
| 6,993,714 B2 | 1/2006 | Kaler et al. |
| 6,996,776 B1 | 2/2006 | Makely et al. |
| 6,996,781 B1 | 2/2006 | Myers et al. |
| 7,000,179 B2 | 2/2006 | Yankovich et al. |
| 7,002,560 B2 | 2/2006 | Graham |
| 7,003,722 B2 | 2/2006 | Rothchiller et al. |
| 7,010,580 B1 | 3/2006 | Fu et al. |
| 7,020,869 B2 | 3/2006 | Abriari et al. |
| 7,024,417 B1 | 4/2006 | Russakovsky et al. |
| 7,032,170 B2 | 4/2006 | Poulose et al. |
| 7,036,072 B1 | 4/2006 | Sulistio et al. |
| 7,039,875 B2 | 5/2006 | Khalfay et al. |
| 7,043,687 B2 | 5/2006 | Knauss et al. |
| 7,051,273 B1 | 5/2006 | Holt et al. |
| 7,058,663 B2 | 6/2006 | Johnston et al. |
| 7,062,764 B2 | 6/2006 | Cohen et al. |
| 7,065,493 B1 | 6/2006 | Homsi |
| 7,076,728 B2 | 7/2006 | Davis et al. |
| 7,080,083 B2 | 7/2006 | Kim et al. |
| 7,080,325 B2 | 7/2006 | Treibach-Heck et al. |
| 7,086,009 B2 | 8/2006 | Resnick et al. |
| 7,086,042 B2 | 8/2006 | Abe et al. |
| 7,088,374 B2 | 8/2006 | David et al. |
| 7,100,147 B2 | 8/2006 | Miller et al. |
| 7,103,611 B2 | 9/2006 | Murthy et al. |
| 7,106,888 B1 | 9/2006 | Silverbrook et al. |
| 7,107,282 B1 | 9/2006 | Yalamanchi |
| 7,107,521 B2 | 9/2006 | Santos |
| 7,120,863 B1 | 10/2006 | Wang |
| 7,130,885 B2 | 10/2006 | Chandra et al. |
| 7,143,341 B1 | 11/2006 | Kohli |
| 7,146,564 B2 | 12/2006 | Kim et al. |
| 7,152,205 B2 | 12/2006 | Day et al. |
| 7,168,035 B1 | 1/2007 | Bell et al. |
| 7,178,166 B1 | 2/2007 | Taylor et al. |
| 7,190,376 B1 | 3/2007 | Tonisson |
| 7,191,394 B1 | 3/2007 | Ardeleanu et al. |
| 7,200,816 B2 | 4/2007 | Falk et al. |
| 7,213,200 B2 | 5/2007 | Abe et al. |
| 7,236,982 B2 | 6/2007 | Zlatanov et al. |
| 7,249,328 B1 | 7/2007 | Davis |
| 7,272,789 B2 | 9/2007 | O'Brien |
| 7,281,018 B1 | 10/2007 | Begun et al. |
| 7,284,208 B2 | 10/2007 | Matthews |
| 7,287,218 B1 | 10/2007 | Knotz et al. |
| 7,296,017 B2 | 11/2007 | Larcheveque et al. |
| 7,313,758 B2 | 12/2007 | Kozlov |
| 7,316,003 B1 | 1/2008 | Dulepet et al. |
| 7,318,237 B2 | 1/2008 | Moriconi et al. |
| 7,334,178 B1 | 2/2008 | Stanciu et al. |
| 7,337,391 B2 | 2/2008 | Clarke et al. |
| 7,337,392 B2 | 2/2008 | Lue |
| 7,346,610 B2 | 3/2008 | Ruthfield et al. |
| 7,346,840 B1 | 3/2008 | Ravishankar et al. |
| 7,346,848 B1 | 3/2008 | Ruthfield et al. |
| 7,350,141 B2 | 3/2008 | Kotler et al. |
| 7,373,595 B2 | 5/2008 | Jones et al. |
| 7,412,649 B2 | 8/2008 | Emek et al. |
| 7,424,671 B2 | 9/2008 | Elza et al. |
| 7,428,699 B1 | 9/2008 | Kane et al. |
| 2001/0007109 A1 | 7/2001 | Lange |
| 2001/0022592 A1 | 9/2001 | Alimpich et al. |
| 2001/0024195 A1 * | 9/2001 | Hayakawa ............ 345/173 |
| 2001/0037345 A1 | 11/2001 | Kiernan |
| 2001/0054004 A1 | 12/2001 | Powers |
| 2001/0056429 A1 | 12/2001 | Moore et al. |
| 2001/0056460 A1 * | 12/2001 | Sahota et al. .......... 709/201 |
| 2002/0010700 A1 | 1/2002 | Wotring et al. |
| 2002/0010743 A1 | 1/2002 | Ryan et al. |
| 2002/0010746 A1 | 1/2002 | Jilk et al. |
| 2002/0010855 A1 | 1/2002 | Reshef et al. |
| 2002/0013788 A1 | 1/2002 | Pennell et al. |
| 2002/0019941 A1 | 2/2002 | Chan et al. |
| 2002/0023113 A1 | 2/2002 | Hsing et al. |
| 2002/0026441 A1 | 2/2002 | Kutay |
| 2002/0026461 A1 | 2/2002 | Kutay et al. |

| Publication No. | Date | Inventor |
|---|---|---|
| 2002/0032590 A1 | 3/2002 | Anand et al. |
| 2002/0032692 A1 | 3/2002 | Suzuki et al. |
| 2002/0032706 A1 | 3/2002 | Perla et al. |
| 2002/0032768 A1 | 3/2002 | Voskuil |
| 2002/0035579 A1 | 3/2002 | Wang et al. |
| 2002/0035581 A1 | 3/2002 | Reynar et al. |
| 2002/0040469 A1 | 4/2002 | Pramberger |
| 2002/0054126 A1 | 5/2002 | Gamon |
| 2002/0057297 A1 | 5/2002 | Grimes et al. |
| 2002/0065798 A1 | 5/2002 | Bostleman et al. |
| 2002/0065847 A1 | 5/2002 | Furukawa et al. |
| 2002/0070973 A1 | 6/2002 | Croley |
| 2002/0078074 A1 | 6/2002 | Cho et al. |
| 2002/0078103 A1 | 6/2002 | Gorman et al. |
| 2002/0083318 A1 | 6/2002 | Larose |
| 2002/0099952 A1 | 7/2002 | Lambert et al. |
| 2002/0100027 A1 | 7/2002 | Binding et al. |
| 2002/0112224 A1 | 8/2002 | Cox |
| 2002/0129056 A1 | 9/2002 | Conant et al. |
| 2002/0133484 A1 | 9/2002 | Chau et al. |
| 2002/0152222 A1 | 10/2002 | Holbrook |
| 2002/0152244 A1 | 10/2002 | Dean et al. |
| 2002/0156772 A1 | 10/2002 | Chau et al. |
| 2002/0156846 A1 | 10/2002 | Rawat et al. |
| 2002/0156929 A1 | 10/2002 | Hekmatpour |
| 2002/0169752 A1 | 11/2002 | Kusama et al. |
| 2002/0169789 A1 | 11/2002 | Kutay |
| 2002/0174147 A1 | 11/2002 | Wang et al. |
| 2002/0174417 A1 | 11/2002 | Sijacic et al. |
| 2002/0178380 A1 | 11/2002 | Wolf et al. |
| 2002/0184219 A1 | 12/2002 | Preisig et al. |
| 2002/0188597 A1 | 12/2002 | Kern et al. |
| 2002/0188613 A1 | 12/2002 | Chakraborty et al. |
| 2002/0194219 A1 | 12/2002 | Bradley et al. |
| 2002/0196281 A1 | 12/2002 | Audleman et al. |
| 2002/0196288 A1* | 12/2002 | Emrani ........................ 345/810 |
| 2002/0198891 A1 | 12/2002 | Li et al. |
| 2002/0198935 A1 | 12/2002 | Crandall, Sr. et al. |
| 2003/0004951 A1 | 1/2003 | Chokshi |
| 2003/0007000 A1 | 1/2003 | Carlson et al. |
| 2003/0014397 A1 | 1/2003 | Chau et al. |
| 2003/0018668 A1 | 1/2003 | Britton et al. |
| 2003/0020746 A1 | 1/2003 | Chen et al. |
| 2003/0023641 A1 | 1/2003 | Gorman et al. |
| 2003/0025732 A1 | 2/2003 | Prichard |
| 2003/0026507 A1 | 2/2003 | Zlotnick |
| 2003/0028550 A1 | 2/2003 | Lee et al. |
| 2003/0037303 A1* | 2/2003 | Bodlaender et al. ......... 715/523 |
| 2003/0043986 A1 | 3/2003 | Creamer |
| 2003/0046665 A1 | 3/2003 | Ilin |
| 2003/0048301 A1 | 3/2003 | Menninger |
| 2003/0051243 A1 | 3/2003 | Lemmons et al. |
| 2003/0055811 A1 | 3/2003 | Stork et al. |
| 2003/0055828 A1 | 3/2003 | Koch et al. |
| 2003/0056198 A1 | 3/2003 | Al-Azzawe |
| 2003/0061386 A1 | 3/2003 | Brown |
| 2003/0061567 A1 | 3/2003 | Brown et al. |
| 2003/0084424 A1 | 5/2003 | Reddy et al. |
| 2003/0093755 A1 | 5/2003 | O'Carroll |
| 2003/0110443 A1 | 6/2003 | Yankovich et al. |
| 2003/0120578 A1 | 6/2003 | Newman |
| 2003/0120651 A1 | 6/2003 | Bernstein et al. |
| 2003/0120659 A1 | 6/2003 | Sridhar |
| 2003/0120671 A1 | 6/2003 | Kim et al. |
| 2003/0120686 A1 | 6/2003 | Kim et al. |
| 2003/0126555 A1 | 7/2003 | Aggarwal et al. |
| 2003/0128196 A1 | 7/2003 | Lapstun et al. |
| 2003/0135825 A1 | 7/2003 | Gertner et al. |
| 2003/0140132 A1 | 7/2003 | Champagne et al. |
| 2003/0142072 A1 | 7/2003 | Lapstun et al. |
| 2003/0149934 A1 | 8/2003 | Worden |
| 2003/0158897 A1 | 8/2003 | Ben-Natan et al. |
| 2003/0163285 A1 | 8/2003 | Nakamura et al. |
| 2003/0167277 A1 | 9/2003 | Hejlsberg et al. |
| 2003/0182268 A1 | 9/2003 | Lal |
| 2003/0182327 A1 | 9/2003 | Ramanujam et al. |
| 2003/0187756 A1 | 10/2003 | Klivington et al. |
| 2003/0187930 A1 | 10/2003 | Ghaffar et al. |
| 2003/0188260 A1 | 10/2003 | Jensen et al. |
| 2003/0189593 A1* | 10/2003 | Yarvin ........................ 345/762 |
| 2003/0192008 A1 | 10/2003 | Lee |
| 2003/0200506 A1 | 10/2003 | Abe et al. |
| 2003/0204511 A1 | 10/2003 | Brundage |
| 2003/0204814 A1 | 10/2003 | Elo et al. |
| 2003/0205615 A1 | 11/2003 | Marappan |
| 2003/0212664 A1 | 11/2003 | Breining et al. |
| 2003/0212902 A1 | 11/2003 | van der Made |
| 2003/0217053 A1 | 11/2003 | Bachman et al. |
| 2003/0220930 A1 | 11/2003 | Milleker et al. |
| 2003/0225469 A1 | 12/2003 | DeRemer et al. |
| 2003/0225768 A1 | 12/2003 | Chaudhuri |
| 2003/0225829 A1 | 12/2003 | Pena et al. |
| 2003/0226111 A1 | 12/2003 | Wirts et al. |
| 2003/0226132 A1 | 12/2003 | Tondreau et al. |
| 2003/0233374 A1 | 12/2003 | Spinola et al. |
| 2003/0233644 A1 | 12/2003 | Cohen et al. |
| 2003/0236859 A1 | 12/2003 | Vaschillo et al. |
| 2003/0236903 A1 | 12/2003 | Piotrowski |
| 2003/0237046 A1 | 12/2003 | Parker et al. |
| 2003/0237047 A1* | 12/2003 | Borson ........................ 715/513 |
| 2004/0002939 A1 | 1/2004 | Arora |
| 2004/0002950 A1 | 1/2004 | Brennan et al. |
| 2004/0003031 A1 | 1/2004 | Brown et al. |
| 2004/0003353 A1 | 1/2004 | Rivera et al. |
| 2004/0003389 A1 | 1/2004 | Reynar et al. |
| 2004/0010752 A1 | 1/2004 | Chan et al. |
| 2004/0024842 A1 | 2/2004 | Witt |
| 2004/0030991 A1 | 2/2004 | Hepworth et al. |
| 2004/0039990 A1 | 2/2004 | Bakar et al. |
| 2004/0039993 A1 | 2/2004 | Kougiouris et al. |
| 2004/0044961 A1 | 3/2004 | Pesenson |
| 2004/0044965 A1 | 3/2004 | Toyama et al. |
| 2004/0054966 A1 | 3/2004 | Busch et al. |
| 2004/0059754 A1 | 3/2004 | Barghout et al. |
| 2004/0073565 A1 | 4/2004 | Kaufman et al. |
| 2004/0073868 A1 | 4/2004 | Easter et al. |
| 2004/0078756 A1 | 4/2004 | Napper et al. |
| 2004/0083426 A1 | 4/2004 | Sahu |
| 2004/0088647 A1 | 5/2004 | Miller et al. |
| 2004/0088652 A1 | 5/2004 | Abe et al. |
| 2004/0093596 A1 | 5/2004 | Koyano |
| 2004/0107367 A1 | 6/2004 | Kisters |
| 2004/0117769 A1 | 6/2004 | Lauzon et al. |
| 2004/0123277 A1 | 6/2004 | Schrader et al. |
| 2004/0146199 A1 | 7/2004 | Berkner et al. |
| 2004/0148178 A1 | 7/2004 | Brain |
| 2004/0163041 A1 | 8/2004 | Engel |
| 2004/0172442 A1 | 9/2004 | Ripley |
| 2004/0181711 A1 | 9/2004 | Johnson et al. |
| 2004/0186762 A1 | 9/2004 | Beaven et al. |
| 2004/0189708 A1 | 9/2004 | Larcheveque et al. |
| 2004/0189716 A1 | 9/2004 | Paoli et al. |
| 2004/0194035 A1 | 9/2004 | Chakraborty |
| 2004/0205473 A1 | 10/2004 | Fisher et al. |
| 2004/0205525 A1 | 10/2004 | Murren et al. |
| 2004/0205534 A1 | 10/2004 | Koelle |
| 2004/0205571 A1* | 10/2004 | Adler et al. ................. 715/513 |
| 2004/0205592 A1 | 10/2004 | Huang |
| 2004/0205605 A1 | 10/2004 | Adler et al. |
| 2004/0205653 A1 | 10/2004 | Hadfield et al. |
| 2004/0205671 A1 | 10/2004 | Sukehiro et al. |
| 2004/0210599 A1 | 10/2004 | Friedman et al. |
| 2004/0210645 A1 | 10/2004 | Kouznetsov et al. |
| 2004/0221238 A1 | 11/2004 | Cifra et al. |
| 2004/0221245 A1 | 11/2004 | Chickles et al. |
| 2004/0237030 A1 | 11/2004 | Malkin |

| | | |
|---|---|---|
| 2004/0260593 A1 | 12/2004 | Abraham-Fuchs et al. |
| 2004/0261019 A1 | 12/2004 | Imamura et al. |
| 2004/0268229 A1 | 12/2004 | Paoli et al. |
| 2005/0004893 A1 | 1/2005 | Sangroniz |
| 2005/0005248 A1 | 1/2005 | Rockey et al. |
| 2005/0015279 A1 | 1/2005 | Rucker |
| 2005/0015732 A1 | 1/2005 | Vedula et al. |
| 2005/0022115 A1 | 1/2005 | Baumgartner et al. |
| 2005/0027757 A1 | 2/2005 | Kiessig et al. |
| 2005/0028073 A1 | 2/2005 | Henry et al. |
| 2005/0033728 A1 | 2/2005 | James |
| 2005/0038711 A1 | 2/2005 | Marlelo |
| 2005/0055627 A1 | 3/2005 | Lloyd et al. |
| 2005/0060324 A1 | 3/2005 | Johnson et al. |
| 2005/0060721 A1 | 3/2005 | Choudhary et al. |
| 2005/0065933 A1 | 3/2005 | Goering |
| 2005/0065936 A1 | 3/2005 | Goering |
| 2005/0066287 A1 | 3/2005 | Tattrie et al. |
| 2005/0071752 A1 | 3/2005 | Marlatt |
| 2005/0076049 A1 | 4/2005 | Qubti et al. |
| 2005/0091285 A1 | 4/2005 | Krishnan et al. |
| 2005/0091305 A1 | 4/2005 | Lange et al. |
| 2005/0097536 A1 | 5/2005 | Bernstein et al. |
| 2005/0102370 A1 | 5/2005 | Lin et al. |
| 2005/0102612 A1 | 5/2005 | Allan et al. |
| 2005/0108104 A1 | 5/2005 | Woo |
| 2005/0108624 A1 | 5/2005 | Carrier |
| 2005/0114757 A1 | 5/2005 | Sahota et al. |
| 2005/0132043 A1 | 6/2005 | Wang et al. |
| 2005/0132196 A1 | 6/2005 | Dietl |
| 2005/0138031 A1 | 6/2005 | Wefers |
| 2005/0138086 A1 | 6/2005 | Pecht-Seibert |
| 2005/0138539 A1 | 6/2005 | Bravery et al. |
| 2005/0149375 A1 | 7/2005 | Wefers |
| 2005/0160398 A1 | 7/2005 | Bjornson et al. |
| 2005/0171746 A1 | 8/2005 | Thalhammer-Reyero |
| 2005/0198086 A1 | 9/2005 | Moore |
| 2005/0198125 A1 | 9/2005 | Beck et al. |
| 2005/0198247 A1 | 9/2005 | Perry et al. |
| 2005/0210263 A1 | 9/2005 | Levas et al. |
| 2005/0223063 A1 | 10/2005 | Chang et al. |
| 2005/0223320 A1 | 10/2005 | Brintzenhofe et al. |
| 2005/0246304 A1 | 11/2005 | Knight et al. |
| 2005/0262112 A1 | 11/2005 | Moore |
| 2005/0268222 A1 | 12/2005 | Cheng |
| 2006/0020586 A1 | 1/2006 | Prompt et al. |
| 2006/0026534 A1 | 2/2006 | Ruthfield et al. |
| 2006/0031757 A9 | 2/2006 | Vincent, III |
| 2006/0036995 A1 | 2/2006 | Chickles et al. |
| 2006/0041838 A1 | 2/2006 | Khan |
| 2006/0059107 A1 | 3/2006 | Elmore et al. |
| 2006/0059434 A1 | 3/2006 | Boss et al. |
| 2006/0069605 A1 | 3/2006 | Hatoun |
| 2006/0069985 A1 | 3/2006 | Friedman et al. |
| 2006/0080657 A1 | 4/2006 | Goodman |
| 2006/0085409 A1 | 4/2006 | Rys et al. |
| 2006/0101037 A1 | 5/2006 | Brill et al. |
| 2006/0101051 A1 | 5/2006 | Carr et al. |
| 2006/0129583 A1 | 6/2006 | Catorcini et al. |
| 2006/0129978 A1 | 6/2006 | Abriani et al. |
| 2006/0143220 A1 | 6/2006 | Spencer |
| 2006/0161559 A1 | 7/2006 | Bordawekar et al. |
| 2006/0173865 A1 | 8/2006 | Fong |
| 2006/0200754 A1 | 9/2006 | Kablesh et al. |
| 2007/0036433 A1 | 2/2007 | Teutsch et al. |
| 2007/0050719 A1 | 3/2007 | Lui et al. |
| 2007/0061467 A1 | 3/2007 | Essey et al. |
| 2007/0061706 A1 | 3/2007 | Cupala et al. |
| 2007/0074106 A1 | 3/2007 | Ardeleanu et al. |
| 2007/0094589 A1 | 4/2007 | Paoli et al. |
| 2007/0100877 A1 | 5/2007 | Paoli et al. |
| 2007/0101280 A1 | 5/2007 | Paoli et al. |
| 2007/0118803 A1 | 5/2007 | Walker et al. |
| 2007/0130504 A1 | 6/2007 | Betancourt et al. |
| 2007/0186157 A1 | 8/2007 | Walker et al. |
| 2007/0208606 A1 | 9/2007 | MacKay et al. |
| 2007/0208769 A1 | 9/2007 | Boehm et al. |
| 2008/0028340 A1 | 1/2008 | Davis |

FOREIGN PATENT DOCUMENTS

| | | |
|---|---|---|
| EP | 0 961 197 | 12/1999 |
| EP | 1 076 290 A2 | 2/2001 |
| EP | 1221661 | 7/2002 |
| JP | 63085960 | 4/1988 |
| JP | 401173140 A | 7/1989 |
| JP | 3191429 | 8/1991 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 2000132436 | 5/2000 |
| JP | 2002183652 | 6/2002 |
| JP | 2003173288 | 6/2003 |
| WO | WO 99/24945 | 5/1999 |
| WO | WO 99/56207 | 11/1999 |
| WO | WO 01/44934 A1 | 6/2001 |
| WO | WO0157720 | 9/2006 |

OTHER PUBLICATIONS

Han et al., "WebSplitter: A Unified XML Framework for Multi-Device Collaborative Web Browsing", 2000, ACM Conference on Computer Supported Cooperative Work, 10 pages.*

Villard et al., "An Incremental XSLT Transformation Processor for XML Document Manipulation", May 2002, 25 pages printed from http://www2002.org/CDROM/refereed/321 on May 18, 2007.*

OMG XML Metadata Interchange (XMI) Specification Version 1.2 Jan. 2002, 270 pages.

"Store and Organize Related Project Files in a Binder," Getting Results with Microsoft Office, 1990, pp. 109-112.

Barker et al., "Creating In-Line Objects Within An Integrated Editing Environment," IBM Technical Disclosure Bulletin, vol. 27, No. 5, Oct. 1984, p. 2962.

Berg A., "Naming and Binding: Monikers" Inside OLE, 1995, Chapter 9, pp. 431-490.

Clapp D., "The NeXT Application Kit Part I: Non-Responsive Classes," The NeXT Bible 1990, Chapter 16, pp. 275-293.

DiLascia et al., "Sweeper" Microsoft Interactive Developer, vol. 1, No. 1, 1996, 27 pages.

Herzner et al., "CDAM- Compound Document Access and Management. An Object-Oriented Approach" Multimedia Systems Interaction and Applications, 1992, Chapter 3, pp. 17-36.

Kobayashi et al., "An Update on BTRON-specification OS Development" IEEE 1991 pp. 132-140.

Peterson B., "Unix Variants," Unix Review, vol. 10, No. 4, Apr. 1992, pp. 29-31.

Pike et al., "Plan 9 from Bell Labs" UKUUG, Summer 1990, 10 pages.

Pike et al., "The Use of Name Spaces in Plan 9," Operating Systems Review vol. 27, No. 2, Apr. 1993, pp. 72-76.

Staneck W., "Internal and External Media" Electronic Publishing Unleashed, 1995, Chapter 22, pp. 510-542.

Zdonik S., "Object Management System Concepts," ACM, 1984, pp. 13-19.

Trupin J., "The Visual Programmer," Microsoft Systems Journal, Apr. 1996, pp. 103-105.

"Architecture for a Dynamic Information Area Control" IBM Technical Disclosure Bulletin IBM Corp. New York US vol. 37 No. 10 Jan. 10, 1994. pp. 245-246.

Alschuler, Liora, "A tour of Xmetal" O'Reilly XML.COM 'Online Jul. 14, 1999 XP002230081 retrieved from the internet: <URL:http://www.xml.com/pub/a/SeyboldReport/ip0311025.html> retrieved on Feb. 5, 2003, 2 pages.

Au, Irene et al., "Netscape Communicator's Collapsible Toolbars" CHI'98 Human Factors in Computing Systems Conference Proceedings Los Angeles CA Apr. 18-23, 1998 pp. 81-86.

Battle, Steven A. et al., "Flexible Information Presentation with XML" 1998, The Institution of Electrical Engineers, 6 pages.

Brogden, William, "Arbortext Adept 8 Editor Review" O'Reilly XML.COM 'Online! Sep. 22, 1999 XP002230080 retrieved from the Internet <URL:http://www.xml.com/pub/a/1999/09/adept/AdeptRvw.htm> retrieved on Feb. 5, 2003, 4 pages.

Ciancarini, Paolo et al., "Managing Complex Documents Over the WWW: A Case Study for XML" IEEE Transactions on Knowledge and Data Engineering Vo.l. 11 No. 4 Jul./Aug. 1999, pp. 629-938.

Davidow, Ari, "XML Editors: Allegations of Functionality in search of reality," Internet 'Online 1999 ! XP002230082 retrieved from the Internet <URL:http://www.ivritype.com/xml/>, 12 pages.

Kanemoto, Hirotaka et al., "An Efficiently Updatable Index Scheme for Structured Documents" 1998 IEEE, pp. 991-996.

Sutanthavibul, Supoj et al., "XFIG Version 3.2 Patchlevel 2 (Jul. 2, 1998) Users Manual (Edition 1.0)" Internet Document [Online] Jul. 2, 1998 XP002229137 Retrieved from the Internet: <URL:http://www.ice.mtu.edu/online_docs/xfig332/> [retrieved on Jan 28, 2003], 66 pages.

Usdin, Tommie et al., "XML: Not a Silver Bullet But a Great Pipe Wrench" Standardview vol. 6. No. 3, Sep. 1998, pp. 125-132.

Hwang et al., "Micro-Firewalls for Dynamic Network Security with Distributed Intrusion Detection"; IEEE INternational Symposium on Network Computing and Applications, 2001; pp. 68-79.

Kaiya, et al., "Specifying Runtime Environments and Functionalities of Downloadable Components Under the Sandbox Mode"; International Symposium on Principles of Software Evolution; 2000; pp. 138-142.

Prevelakis et al., "Sandboxing Applications"; Proceedings of the FREENIX Track; 2001; pp. 119-126.

Schmid et al., "Protection Data from Malicious Software"; 18th Annual Computer Security Applications Conference; 2002; pp. 199-208.

Tomimori et al., "An Efficient and Flexible Access Control Framework for Java Programs in Mobile Terminals"; 22nd International Conference on Distributed Computing Systems Workshops; 2002; pp. 777-782.

Whitehill, "Whitehill Composer" Whitehill Technologies Inc. 2 pages.

Clarke, P., "From small beginnings," Knowledge Management, Nov. 2001, pp. 28-30.

Description of Whitehill Composer software product, produced by Whitehill Technologies, Inc., available at <http://www.xml.com/pub/p/221>, accessed on Apr. 8, 2004, two pages.

Sun, Q., et al., "A Robust and Secure Media Signature Scheme for JPEG Images," Proceedings of 2002 IEEE Workshop on Multimedia Signal Processing, Dec. 2002, pp. 296-299.

Komatsu, N., et al., "A Proposal on Digital Watermark in Document Image Communication and Its Application to Realizing a Signature," Electronics and Communications in Japan, Part I: Communications, vol. 73, No. 5, May 1990, pp. 22-33.

Noore, A., "A Secure Conditional Access System using Digital Signature and Encryption," International Conference on Consumer Electronics, Jun. 2003, pp. 220-221.

Pacheco, X., et al., "Delphi 5 Developer's Guide," Sams Publishing 1999, Section: Data Streaming, 6 pages.

Clark, James, Ed.; "XSL Transformation (XSLT) Version 1.0", Nov. 16, 1999, W3C (MIT, INRIA, Keio), pp. 1-156.

Clark, James and Steve Derose, "XML Path Language (XPath) Version 1.0", Nov. 16, 1999, W3C (MIT, INRIA, Keio), pp. 1-49.

Musgrave, S., "Networking technology—impact and opportunities" Survey and Statistical Computing 1996. Proceedings of the Second ASC International Conference. Sep. 1996. pp. 369-78. London, UK.

Rapaport, L., "Get more from SharePoint", Transform Magazine, vol. 11, No. 3. Mar. 2002, pp. 13, 15.

McCright, J.S., "New Tool Kit to Link Groove with Microsoft SharePoint", eWeek, Enterprise News & Reviews, Ziff Davis Media Inc., Jul. 29, 2002, 1 page.

U.S. Appl. No. 60/209,713, filed Jun. 5, 2000, 345 pages.

Richard Scott Hall, "Agent-based Software Configuration and Deployment," Thesis of the University of Colorado, Online, Dec. 31, 1999, retrieved from the Internet on Nov. 7, 2003: <http://www.cs.colorado.edu/users/rickhall/documents/ThesisFinal.pdf>, 169 pages.

Arthur Van Hoff et al., "The Open Software Description Format," Online, Aug. 13, 1997, retrieved from the Internet on Nov. 7, 2003: <http://www.w3.org/TR/NOTE-OSD>, 11 pages.

Netscape Communications Corp., "SmartUpdate Developer's Guide," Online, Mar. 11, 1999, retrieved from the Internet on Dec. 8, 2000: <http://developer.netscape.com:80/docs/manuals/communicator/jarman/index.htm>, 83 pages.

Linnea Dayton and Jack Davis, "Photo Shop 5/5.5 WOW! Book," 2000, Peachpit Press, pp. 8-17.

Sara Williams and Charlie Kindel, "The Component Object Model: A Technical Overview," Oct. 1994, Microsoft Corp., pp. 1-14.

Varlamis et al., "Bridging XML-Schema and relational databases. A system for generating and manipulating relational databases using valid XML documents," DocEng '01, Nov. 9-10, 2001, Copyright 2001, ACM 1-58113-432-0/01/0011, pp. 105-114.

Hardy et al., "Mapping and Displaying Structural Transformations between XML and PDF," DocEng '02, Nov. 8-9, 2002, Copyright 2002, ACM 1-58113-594-7/02/0011, pp. 95-102.

Kim et al., "Immediate and Partial Validation Mechanism for the Conflict Resolution of Update Operations in XML Databases," WAIM 2002, LNCS 2419, 2002, pp. 387-396, Springer-Verlag Berlin Heidelberg 2002.

Chuang, T., "Generic Validation of Structural Content with Parametric Modules," ICFP '01, Sep. 3-5, 2001, Copyright 2001, ACM 1-58113-415-0/01/0009, pp. 98-109.

Chen et al., "Designing Valid XML Views," ER 2002, LNCS 2503, 2002, Springer-Verlag Berlin Heidelberg 2002, pp. 463-477.

Chen et al., "XKvalidator: A Constraint Validator for XML," CIKM '02, Nov. 4-9, 2002, Copyright 2002, ACM 1-58113-492-4/02/0011, pp. 446-452.

Rogge et al:, "Validating MPEG-21 Encapsulated Functional Metadata," IEEE 2002, pp. 209-212.

Nelson, "Validation with MSXML and XML Schema," Windows Developer Magazine, Jan. 2002. pp. 35-38.

Chien et al., "XML Document Versioning," SIGMOD Record, vol. 30, No. 3, Sep. 2001, pp. 46-53.

Wong et al., "Managing and Querying Multi-Version XML Data with Update Logging," DocEng '02, Nov. 8-9, 2002, Copyright 2002, ACM 1-58113-594-7/02/0011, pp. 74-81.

Chien et al., "Efficient schemes for managing multiversionXML documents", VLDB Journal (2002) pp. 332-353.

Chien et al., "Efficient Management of Multiversion Documents by Object Referencing," Proceedings of the 27th VLDB Conference, 2001, pp. 291-300.

Chien et al., "Storing and Querying Multiversion XML Documents using Durable Node Numbers," IEEE 2002, pp. 232-241.

Dyck, T., "XML Spy Tops as XML Editor," http://www.eweek.com/article2/0,3959,724041,00 asp, Nov. 25, 2002, 2 pages.

Jan-Henrick Haukeland: "Tsbiff—tildeslash biff—version 1.2.1" Internet Document, [Online] Jun. 1999, URL:http://web.archive.org/web/19990912001527/http://www.tildeslash.com/tsbiff/, 2 pages.

Laura Acklen & Read Gilgen, "Using Corel Wordperfect 9", 251-284, 424-434, 583-586 (1998).

Bruce Halberg et al, "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.

Leblond et al, "PC Magazine Guide to Quattro Pro for Windows", pp. 9-11, 42-61, Ziff-Davis Press, Copyright 1993 by the LeBlond Group.

Mansfield, "Excel 97 for Busy People", Published by Osborne/Mcgraw-Hill 1997 pp. 48-50.

"Microsoft Visual Basic 5.0 Programmer's Guide 1997"; pp. 578-579; Redmond WA 98052-6399.

Atova, "User Reference manual Version 4.4, XML Spy suite 4.4," Atova Ges.m.b.H and Altova, Inc., May 24, 2002, pages cover, copyright page, 1-565.

Altova et al. XML Spy, XML integrated Development Environments, Altova Inc., 2002, pp. 1-18.

Ben-Natan, U.S. Appl. No. 60/203,081, filed May 9, 2000, entitled "Internet platform for creating and supporting communities".

Ixla Soft, "Steamlining content creation, retrieval, and publishing on the Web using TEXTML Server and SML Spy 4 Suite in an integrated, Web publishing environment," (Partner's Whitepaper, published on the Web as of Jun. 6, 2002, downlowad pp. 1-16.

Kutay, U.S. Appl. No. 60/209,713, filed Jun. 5, 2000, entitled, "Methods and systems for accessing, organizing presenting and viewing data".

Microsoft Word 2000 (see Screen Shot "About Microsoft Word") Published 1983-1999 and Microsoft Excel 2000 (see Screen Shot "About Microsoft Excel") Published 1988-1999, Three pages.

Moore, U.S. Appl. No. 60/191,662, filed Mar. 23, 2000, entitled "Collection-based presistent digital archives".

Raggett, "HTML Tables", retrieved on Aug. 6, 2006, at <http:www://is-edu.hcmuns.edu.vn/WebLib/books/Web/Tel/html3-tables.html>>, W3C Internet Draft, Jul. 7, 1995, pp. 1-12.

Microsoft Corporation, "Microsoft Computer Dictionary" Microsoft Press, Fifth Edition, p. 149.

Cover, XML Forms Architecture, retrieved at <<http://xml.coverpages.org/xfa.html>> on Aug. 17, 2006, Coverpages, Jun. 16, 1999.

"Webopedia Computer Dictionary" retrieved on May 9, 2006, at <<http://www.pewebopedia.com/TERM/O/OLE.html>>, Jupitermedia Corporation, 2006, pp. 07.

Altova, Inc., "XML Spy 4.0 Manual," Altova Inc. & Altova GmbH, coyright 1998-2001, Chapters 1, 2, and 6, encompassing pp. 1-17, 18-90 and 343-362.

Cybook, INC.: "Copying the Search Form to Services-based Web Sites" INternet Article, (online) Jul. 26, 2004. "the whole document".

Excel Developer Tip (hereinafter "Excel"), "Determining the Data Type of a Cell", May 13, 1998, p. 1 (available at http://jwalk.com/ss//excel/tips/tip62.htm).

Macromedia, INC.: "Dreamweaver Technote, Changes in copying and pasting in Dreamweaver 4" Internet Article (online). "the whole document".

Rado, Dave: "How to create a template that makes it easy for users to "fill in the blanks", without doing any programming" Microsoft Word MVP FAQ Site, (online) Apr. 30, 2004, the whole document.

Pacheco, Xavier et al., "Delphi 5 Developer's Guide", Sams Publishing. Chapter 31, Section: Data Streaming, (1999), 4 pages.

"Microsoft Word 2000", Screenshots, (1999), 1-5.

Borland, Russo, "Running Microsoft Word 97", 314-315, 338, 361-362, 390, and 714-719.

Brabrand, et al., "Power Forms Declarative Client-side Form Field Validation", (2002), 1-20.

Singh, Darshan "Microsoft InfoPath 2003 By Example", Retrieved from the Internet at http://www.perfectxml.com/InfoPath.asp on Jan. 21, 2007, (Apr. 20, 2003).

Raman, T.V., et al., "XForms 1.0", (Dec. 2001), Section 1-12.2.3 & Appendices A-G.

"Enter Key", Retrieved from the Internet at http://systems.webopedia.com/TERM/Enter_key.html on Dec. 20, 2006.

Lehtonen, Miro et al., "A Dynamic User Interface for Document Assembly", Department of Computer Science, University of Helsinki, (Nov. 2002).

Rees, Michael J., "Evolving the Browser Towards a Standard User Interface Architecture", School of Information Technology, Bond University, Australia, (2001).

"Microsoft Visual Basic 5.0 Programmer's Guide", *Microsoft Press*, (1997), pp. 42-43, 54-58.

Nelson, Joe "Client-side Form Validation Using JavaScript", *Developer Advisory*, (Sep. 21, 2001).

Anat, Eyal et al., "Integrating and Customizing Hereregeneous E-Commerce Applications", The VLDB Journal—The International Journal on Very Large Data Bases, vol. 10, Issue 1, (Aug. 2001), 16-38.

Adams, Susie et al., "BizTalk Unleashed", Sams publishing, 2002, first printing Mar. 2001, 1-2, 31-138.

Vasters, Clemens, F., "Biz Talk Server 2000 A Beginner's Guide", Osborne/McGraw-Hill,(2001), 1-2, 359-402.

Halberg, Bruce et al., "Using Microsoft Excel 97", (1997),191-201, 213-219.

Beauchemin, Dave "Using InfoPath to Create Smart Forms", Retrieved from the Internet at http:/www.microsoft.com/office/infopath/prodinfo/using.mspx on Jan. 21, 2007,(Mar. 27, 2003).

Begun, Andrew et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer). aspx on Jan. 21, 2007,(Aug. 2004).

Dubinko, Micah "XForms and Microsoft InfoPath", Retrieved from the Internet at http://www.xml.com/lpt/a/1311 on Jan. 21, 2007,(Oct. 29, 2003).

Udell, Jon "InfoPath and XForms", Retrieved from the Internet at http://weblog.infoworld.com/udell/2003/02/26.html,(Feb. 26, 2003).

Hoffman, Michael "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).

Grosso, et al., "XML Fragment Interchange", W3C,(Feb. 2001),1-28.

Altova, et al., "User and Reference Manual Version 4.4", www.xmlspy.com, (May 24, 2007), 1-565.

"XForm 1.0", W3C,(Jul. 16, 2001).

"Microsoft Word 2000 Screenshots", (2000),11-17.

XMLSPY, "XmlSpy 2004 Enterprise Edition Manual", Altova,(May 17, 2004),1-25, 220-225.

StylusStudio, "StylusStudio: XPath Tools", 2004-2007, StylusStudio,1-14.

Dodds, "Toward an XPath API", xml.com,(May 7, 2001),1-3.

Altova, "Altova Tools for XPath 1.0/2.0", Altova,1-12.

"Microsoft Word 2000 Screenshots", Word,(2000),1-17.

Hu, et al., "A Programmable Editor for Developing Structured Documents based on Bidirectional Transformations", ACM,(Aug. 2004),178-179.

Bradley, Neil "The XML Companion, Third Edition", Published by Addison Wesley Professional, http://proquest.safaribooksonline.com0201770598, http,(Dec. 12, 2001),1-18.

Klarlund, Nils "DSD: A Schema Language for XML", *ACM, FSMP* Portland Oregon, (2000),101-111.

Watt, Andrew "MIcrosoft Office Infopath 2003 Kick Start", (Published by Sams) Print ISBN-10:0-672-32623-X, (Mar. 24, 2004),1-57.

Bray, Tim "Extensible Markup Language (XML)", http://www.textuality.com/sgml-erb/WD-xml.html, second named inventor Jean Paoli, third named inventor C.M. Sperberg-McQueen,(Feb. 10, 1998),37 Pages.

Kay, Michael "XSL Transfornmations (XSLT) Version 2.0", http://www.w3.org/TR/2005/WD-xslt20-20050404, (Apr. 2005), 1-374.

\* cited by examiner

SYSTEM AND METHOD FOR INCREMENTALLY TRANSFORMING AND RENDERING HIERARCHICAL DATA FILES

TECHNICAL FIELD

This invention relates to incrementally transforming and rendering hierarchical data files.

BACKGROUND

Extensible markup language (XML) is increasingly becoming the preferred format for transferring information. XML is a tag-based hierarchical language that is extremely rich in terms of the information that it can be used to represent. For example, XML can be used to represent information spanning the spectrum from semi-structured information (such as one would find in a word processing document) to generally structured information (such as that which is contained in a table). XML is well-suited for many types of communication including business-to-business and client-to-server communication. For more information on XML, XSLT, and XSD (schemas), the reader is referred to the following documents which are the work of, and available from the W3C (World Wide Web consortium): XML 1.0 second edition specification; XSL Transformations (XSLT) Version 1.0; XML Schema Part 1: Structures; and XML Schema Part 2: Datatypes.

Before information can be transferred, however, it must first be collected. To collect information from a user, an XML data file usually is transformed into a viewable, editable form. This form, called a rendered form, is created by applying a transformation file on the XML data file. This rendered form is typically written in HTML (HyperText Machine Language) or eXtensible HTML (XHTML), and is designed to allow a user to enter data into data-entry fields that map to locations in the XML data file. Thus, the user can enter data into a particular data-entry field and that data will be stored in a particular part (or "node") of the XML data file.

A transformation file used to transform the XML data file into a rendered form is typically written in XSLT. Applying an XSLT transformation file on an XML data file generates an XHTML rendering file, which, when executed, generates a rendered form.

One of the problems with rendered forms is that, as a user edits the XML data file by editing the XHTML rendered form, the form does not reflect all changes to the data file. Even though the data entered into a data-entry field in the form may appear in that data-entry field (though this is typically done through means other than transforming the data file by applying a transformation file), this to input often affects other parts of the data file and how that data file should be rendered in a rendered form.

By way of example, a XSLT transformation file can be applied on the XML data file and, by so doing, change nodes of the data file other than the node into which data was input. Applying an XSLT transformation file on an XML data file can even change the structure of the data file. Also, by applying the transformation file on the data file, the transformation file may need to access databases to find data to use in computations or to input into a node of the data file, such as a function whereby when a zip code is entered into a data-entry field. Here, transforming the data file by applying the transformation file fills in other nodes of the data file (and thus also the data-entry fields of the rendered form) for the city and state corresponding to the zip code.

The rendered form does not reflect these changes to the data file because XSLT transformations are one-way. In other words, applying an XSLT transformation file to an XML data file creates a rendered form, but as the XML data file changes, the rendered form does not. Thus, the rendered form can be out-of-date with how the data file should be when the data file receives a new input.

To give the user an up-to-date rendered form, the XSLT transformation can be reapplied to the XML data file after each change made to the data file. The result of such a full transformation is a full rendering file, from which a new rendered form can be created. By so doing, the user sees an accurate rendering (sometimes called a "view") of the current state of the XML data file.

One problem with this, however, is that applying an XSLT transformation to an XML data file can be slow and require extensive computer resources.

Further, while this full transformation can be slow, executing the result of this transformation (a full rendering file), can also take extensive time and resources.

Because of the amount of time and resources required to transform the XML data file and render a full rendering file into a rendered form, a user often cannot efficiently view changes to an XML data file in the rendered form while editing the rendered form. With each edit made by the user, the user has to wait for a new rendered form to be created. Transforming an XML data file to create a new rendering file and then executing the rendering file into a rendered form can take many seconds. Having to wait this long each time the user makes a change inhibits the user from quickly and easily editing an XML data file through a rendered form of that XML data file.

SUMMARY

The following description and figures describe a hierarchical data processing engine for faster and more efficient transformation and rendering of data files. This hierarchical data processing engine enables a user to more quickly and easily edit data files by performing less than a full transformation of a full data file and by reducing the quantity of rendering used to render a change to a rendered form. The hierarchical data processing engine selects among multiple subprocesses, picking among them to transform and render the data file more quickly. In one implementation, the hierarchical data processing engine selects among four subprocesses, picking the subprocess that will accurately and most quickly render a change in a data file.

BRIEF DESCRIPTION OF THE DRAWINGS

The same numbers are used throughout the disclosure and figures to reference like components and features.

DETAILED DESCRIPTION

The following disclosure describes a faster and less resource-intensive way to transform and render data files. If a user enters data into a data file through its rendered form, a system will receive the data and store the data. Once this is done, a hierarchical data processing engine will accurately reflect how this received data changes the data file and a rendered form for the data file. This hierarchical data processing engine can, in a fraction of the time and resources that would be used in transforming the entire data file and rendering the entire result, transform and render the data file to reflect a change. It does so by performing a partial (or no) transformation and/or a partial rendering. How the hierarchical data processing engine is able to do so, and in what circumstances, will be discussed below.

For discussion purposes, the system and method described herein are described in the context of a single computer, a user-input device, and a single display screen. These devices will be described first, followed by a discussion of the techniques in which these and other devices can be used.

Exemplary System

Figure 1:
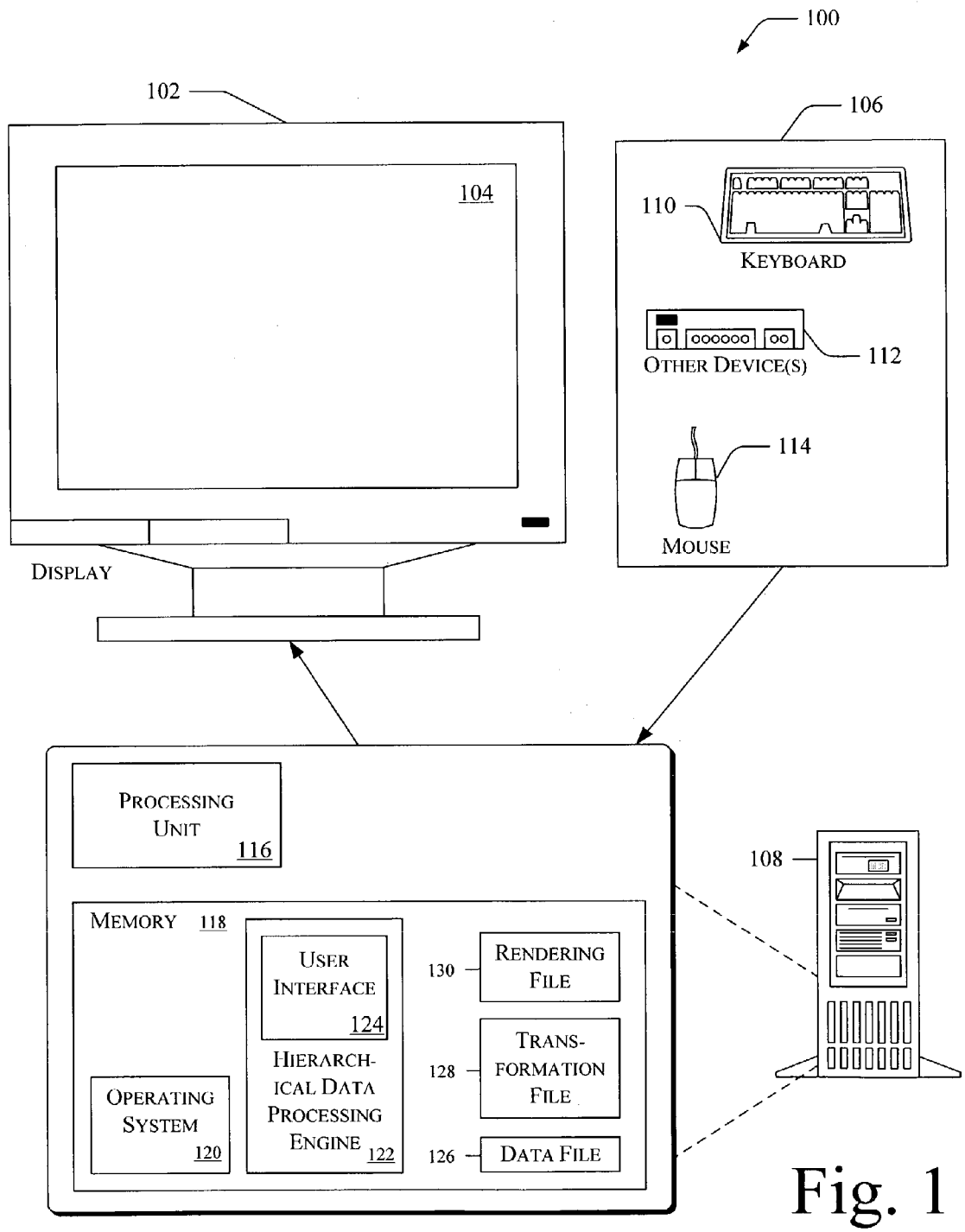
FIG. 1 illustrates a system capable of implementing a method for incremental transformation and rendering of hierarchical data files.

FIG. 1 shows an exemplary system 100 to facilitate incremental transformation and rendering of hierarchical data files.

The system 100 includes a display 102 having a screen 104, user-input device 106, and a computer 108. The user-input device 106 can include any device allowing a computer to receive a user's input, such as a keyboard 110, other devices 112 (such as a touch screen, a voice-activated input device, a track ball, and the like), and a mouse 114. With the user-input device 106, a user can edit a data file by adding or deleting information within a data-entry field on a rendered form, for instance. The user can use the display 102 and its screen 104 to view rendered forms of the data files.

The computer 108 includes a processing unit 116 to execute applications and/or files, and a memory 118 containing applications and files. The memory 118 includes volatile and non-volatile memory, and applications and files, such as an operating system 120 and a hierarchical data processing engine application 122, including a user interface 124. The memory 118 also includes a data file 126, a transformation file 128, a rendering file 130.

A rendered form provides a view and way through which to edit the data file 126 and is depicted on screen 104 through execution of the data file's rendering file 130. To edit the data file 126 in a user-friendly way, the rendered form gives the user a graphical, visual representation of data-entry fields showing previously entered data or blank data-entry fields into which the user can enter data.

Data Files, Transformation Files, Rendering Files, and Rendered Forms

The data file 126, transformation file 128, rendering file 130, and a rendered form work together to allow a user to edit the data file 126. A user can input data into and view data in the data file 126 through the rendered form of the data file. This rendered form is the result of executing the rendering file 130, which is created by applying the transformation file 128 on the data file 126.

Figure 2:
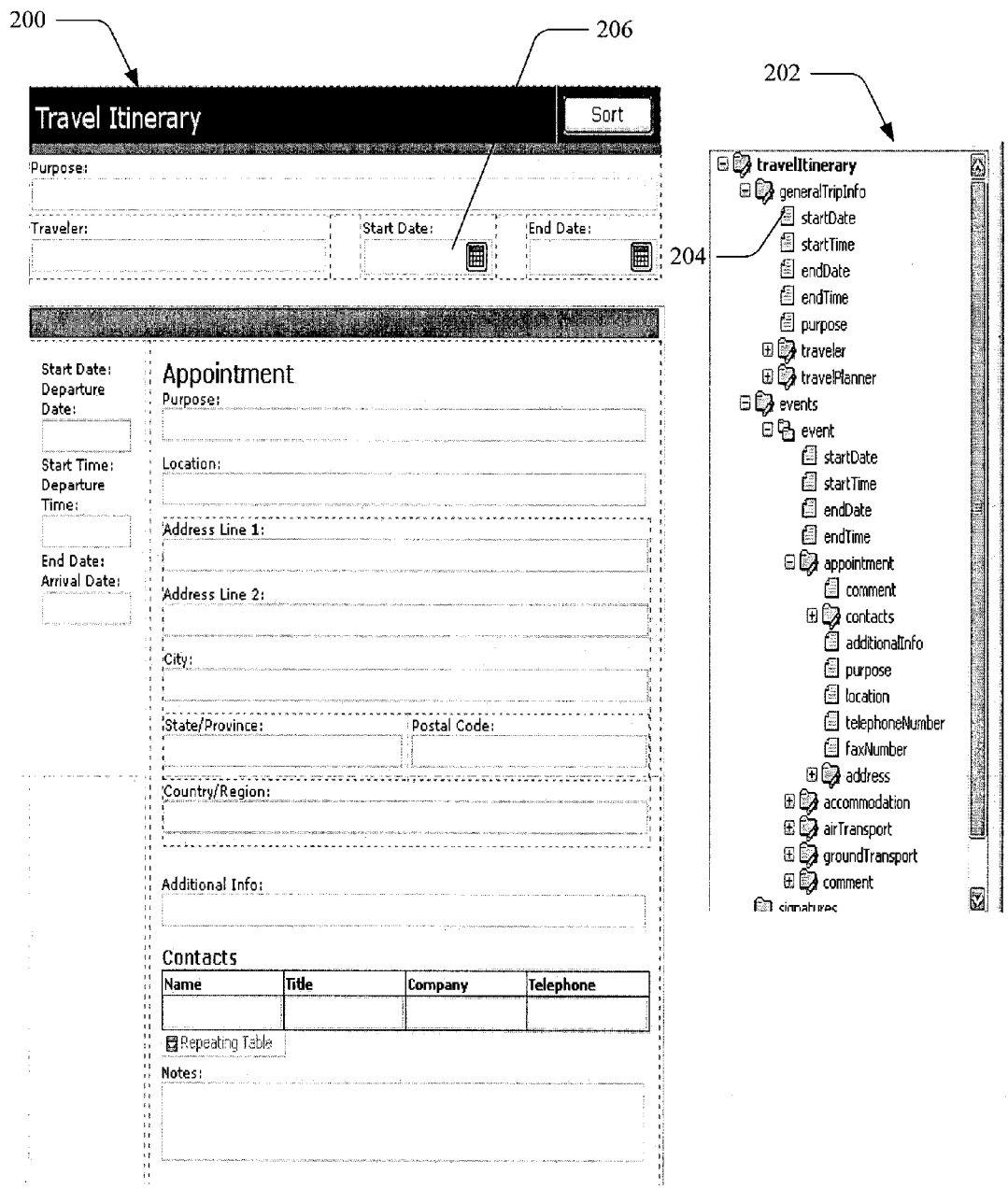
FIG. 2 illustrates an exemplary blank, rendered form of a hierarchical data file and an incomplete view of the hierarchical data file.

FIG. 2 shows a rendered form 200 entitled "Travel Itinerary", which is generated by executing the rendering file 130. This travel itinerary rendered form 200 contains data-entry fields in which a user can enter data. These data-entry fields map to the data file 126, so that the data entered into the form are retained in the data file 126.

Data input into a particular data-entry field of the rendered form is stored in a particular node of the data file 126. Data-entry fields of the rendered form correlate to nodes of the data file 126 in part because the rendered form is the result of the transformation file 128 being applied on the data file 126. The system 100 can use various ways to detect which data-entry fields correlate to which nodes of the data file 126, including through mapping with XPath expressions.

Also in FIG. 2, a graphical representation of the data file 126 is shown as a data file tree 202. The data file tree 202 shows icons representing nodes of the data file 126. Many of these nodes correlate to data-entry fields shown in the travel itinerary rendered form 200. For instance, a trip start date node 204 correlates to a trip start date data-entry field 206. Thus, data entered by a user into the trip start date data-entry field 206 can be stored in the trip start date node 204 of the data file 126.

The transformation file 128 also correlates to the data file 126. Nodes of the data file 126 correlate to particular parts of the transformation file 128, also called nodes for the purposes of this description. Thus, nodes of the transformation file 128 correlate to nodes of the data file 126. This correlation can arise from nodes of the transformation file 128 being mapped to the nodes of the data file 126, including through XPath expressions, or otherwise.

That certain nodes of the transformation file 128 correlate to certain nodes of the data file 126 is often not enough, however, for the system 100 to accurately reflect a change in a particular node of the data file 126 by simply applying only a particular node of the transformation file 128 on a particular node of the data file 126. A node of the transformation file 128, when applied on a node of the data file 126, may affect many nodes of the data file 126. A node of the transformation file 128 could, for instance, be one that, as part of being applied on a node of the data file 126, is also applied on previously filled-in or as-yet-unfilled-in nodes of the data file 126. This concept is illustrated in FIG. 3.

Figure 3:
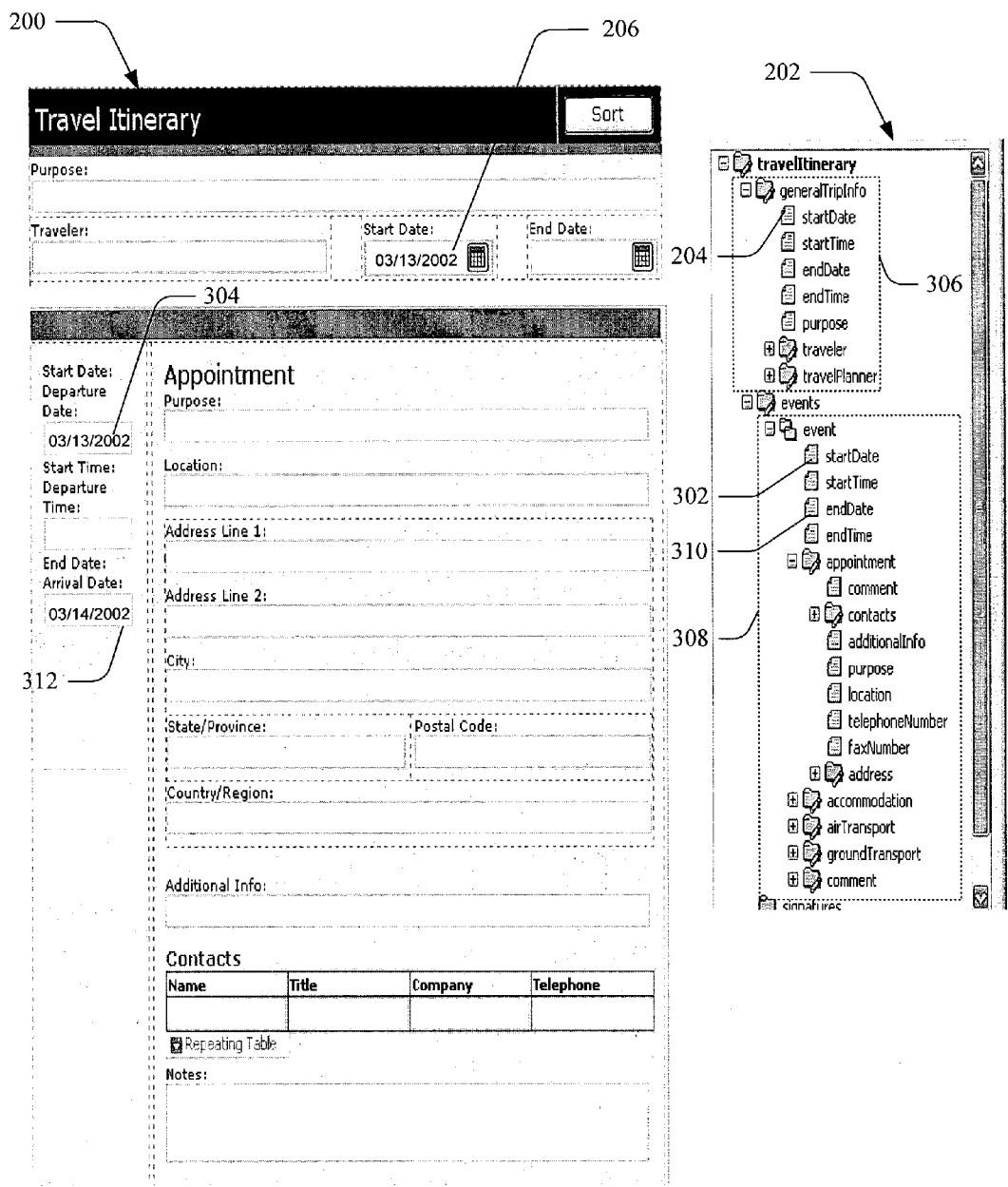
FIG. 3 illustrates an exemplary rendered form of a hierarchical data file and an incomplete view of the hierarchical data file.

FIG. 3 shows the rendered form 200, in this case including filled-in data-entry fields. Here the rendered form is generated after data was input by a user into the trip start date data-entry field 206, "03/13/2002". After the hierarchical data processing engine 122 produced a partial rendering file (discussed below), the system 100 rendered the partial rendering file. In this example, the transformation file 128, when applied, affected other nodes of the data-entry field other than just the trip start date node 204, in this case an event start date node 302. Because the transformation file 128 (or a part thereof) affected the event start date node 302, the rendering file 130 included that change. Thus, when executed, the rendering file 130 produced an updated travel itinerary rendered form 200, including the data shown in an event start date data-entry field 304 in FIG. 3. Here, the transformation file 128 altered the event start date node 302 to include the exact same data entered into the trip start date data-entry field 206 of FIG. 2. A transformation file may perform such an action to make it easier for the user in cases where a future node/data-entry field is likely to have the same data.

Further, the node of the transformation file 128 may direct the system to perform computations or other operations using other resources, like a database. For these and other reasons, the hierarchical data processing engine 122 analyzes the results of nodes of the transformation file 128 being applied on nodes of the data file 126 or nodes of some hypothetical data file, which will be discussed in greater detail below.

In some implementations, the transformation file 128 is an XSLT (eXtensible Style-sheet Language Transformation) file, which, when applied to an XML data file, generates a XHTML (eXtensible Hyper-Text Machine Language) or HTML (Hyper-Text Machine Language) rendering file (such as the rendering file 130). The transformation file 128 can also be an arbitrary XSLT file, such as a custom-made file or some other W3C-compliant file. XHTML and HTML files can be used to show a view on the screen 104, such as the travel itinerary rendered form 200 of FIG. 2.

Like transformation files, data files can come in various types and styles. Hierarchical data files can be written in XML or some other mark-up language, or can be written in other hierarchical languages. Hierarchical data files also are typically concise and data-centered so that the data they contain can be more easily accessed or manipulated by multiple software applications, including software not typically used in a solution, such as an application that searches for a particular type of data and compiles that data into a report. A non-typical application, for example, could be one that compiles a report of all of the travel itineraries performed by a certain person by searching through and compiling the data entered in travel itinerary data files for a particular person.

The above devices and applications are merely representative, and other known devices and applications may be substituted for or added to those shown in FIG. 1. One example of another known device that can be substituted for those shown in FIG. 1 is the device shown in FIG. 9.

Figure 4:
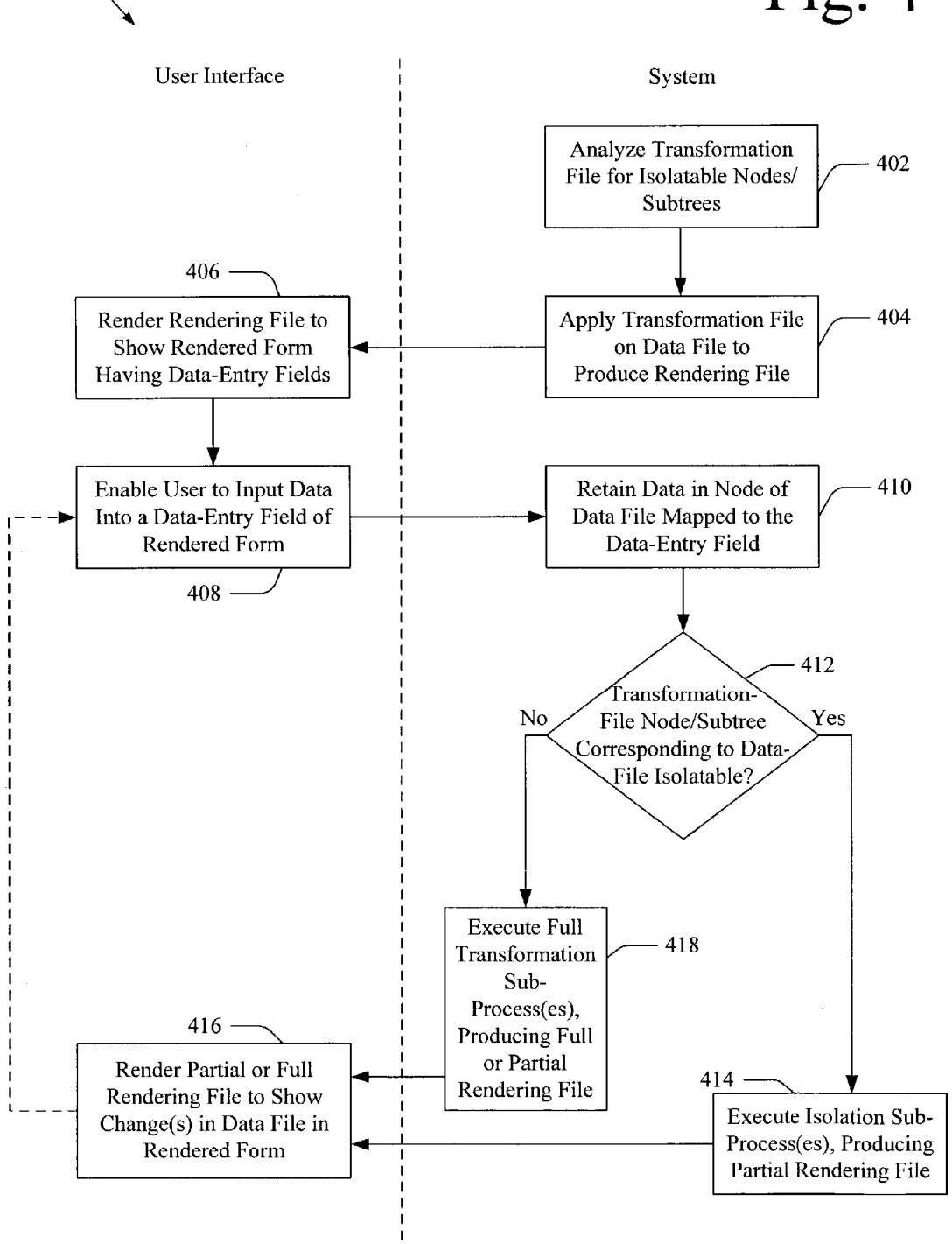
FIG. 4 is a flow diagram of an exemplary process for incrementally transforming and rendering a hierarchical data file.

Techniques for Incremental Transformation and Rendering of Hierarchical Data Files Overview FIG. 4 shows a process 400 for incrementally transforming and rendering a hierarchical data file. Generally, the processes described herein, including process 400, are illustrated as a series of blocks representing individual operations or acts performed by the system 100. The processes may be implemented in any suitable hardware, software, firmware, or combination thereof. In the case of software and firmware, the process represents a set of operations implemented as computer-executable instructions stored in memory and executable by one or more processors.

The hierarchical data processing engine 122 can make more efficient application of many different types of transformation files, including those not intended to produce rendering files. Thus, the hierarchical data processing engine's 122 ability to more quickly and with fewer resources transform a data file makes it useful beyond transforming a data file to create a partial or full rendering file.

For clarity, however, the below description discusses the hierarchical data processing engine 122 in the context of rendering the data file 126.

Analyzing a Transformation File

At block 402, the system 100, through the hierarchical data processing engine 122, analyzes the transformation file 128 for isolatable nodes and subtrees. An isolatable node is one in which data input into that node affects the rendering file 130 only by changing its corresponding data-entry field(s) by replacing the data within that data-entry field(s) with the data input. An isolatable subtree of nodes depends only on nodes within the subtree. Isolatable nodes and subtrees will be further defined and discussed below.

By analyzing the transformation file 128, the hierarchical data processing engine 122 is attempting to determine how little, if any, of the transformation file 128 can be applied to accurately transform and render a change to a node of a data file. This analysis can be performed later in the process 400, but when performed here can be quicker and more efficient because doing it later may slow down the process of rendering the rendering file 130, thereby possibly bogging down the user's editing experience. The result of this analysis (nodes and subtrees being recorded as isolatable and to what extent) is used by the hierarchical data processing engine 122 in blocks 412, 414, and 418, which will be discussed below.

The transformation file 128 can be analyzed independently of the particular data file on which it will be applied. This independent analysis is useful because the transformation file 128 could be applied on data files containing many different sets of data. Further, when performed at this stage, the hierarchical data processing engine 122 may not know what data will be input into any of the nodes of the data file (such as when it is blank of data). So analyzing the transformation file 128 as if a user input any type of data possible into each node of a data file makes the result of the analysis more robust and more accurate. For purposes of this discussion, a blank version of the data file 126 will be analyzed.

If a particular node or subtree of the transformation file 128 is determined to be isolatable, then its corresponding data file node or subtree is also isolatable. Through this determination, the hierarchical data processing engine 122 will have determined how changing the node of the data file 126 could affect the rendering file 130. In some cases, a node of the data file 126 (and its corresponding node in the transformation file 128) will be isolatable in that changing that node will, once the transformation file 128 is applied, result in only that data file node and its corresponding data-entry field in the rendered form being changed, such as with just the data input in the data-entry field. This isolation from affecting other nodes of the data file 126 means that to accurately transform the data file 126, partial or none of the transformation file 128 need be applied.

In other cases, only nodes within a subtree of the changed node will be affected by changing that particular node, which may allow the hierarchical data processing engine 122 to determine that only a particular subtree of the transformation file 128 need by applied to that particular subtree of nodes of the data file 126 in order for the transformation and resulting rendering file 130 to be accurate.

FIG. 3 sets forth two examples of subtrees of the data file 126, a general trip information subtree 306 and an event subtree 308. In this example, the trip start date node 204 is within the general trip information subtree 306 and the event start date node 302 is within the event subtree 308. The subtrees of the transformation file 128 are not shown.

By so isolating nodes of the data file 126 and nodes of the transformation file 128, the hierarchical data processing engine 122 can reduce the time and resources needed to accurately transform the rendering file 130 for a change made to the data file 126. This increase in speed and efficiency helps the user experience a faster, more pleasant way to edit the data file 126.

Figure 5:
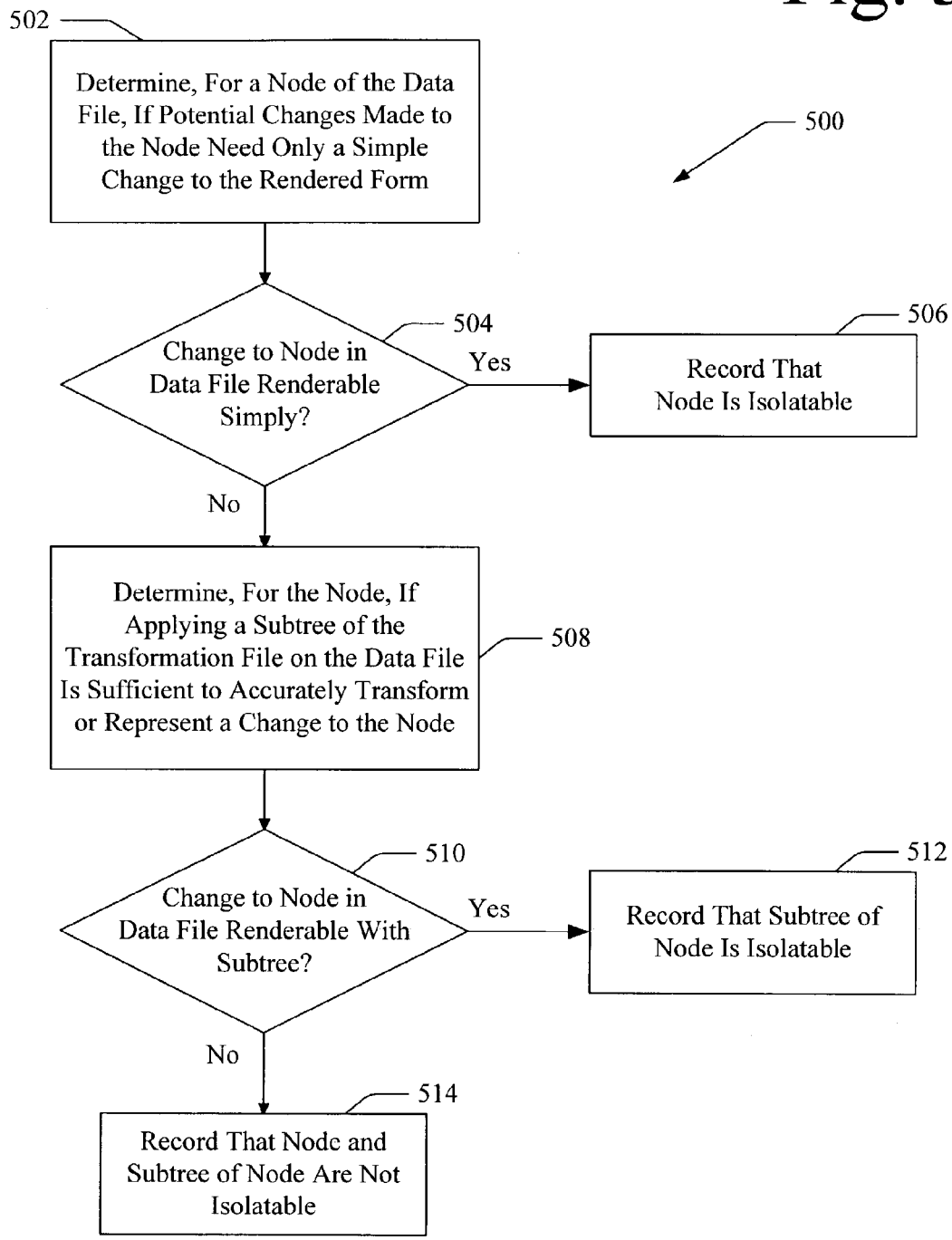
FIG. 5 is a flow diagram of an exemplary process for analyzing a transformation file for isolatable nodes and isolatable subtree of nodes.

How the hierarchical data processing engine 122 determines whether or not a node or subtree of the transformation file 128 and the data file 126 is isolatable is set forth in greater detail in FIG. 5 and its related discussion.

Generating a Rendered Form for a User to View and Edit

In block 404 of FIG. 4, the system 100 applies the transformation file 128 on the data file 126 to produce the rendering file 130. Performing this action can be time consuming, but because it is done at the beginning of the process 400, it does not interfere with the ongoing editing experience of a user.

In block 406, the user interface 124 renders the rendering file 130 to display a rendered form having data-entry fields. The rendered form may appear with a page-like appearance, such as the rendered form 200 of FIGS. 2 and 3. This rendered form 200 contains data-entry fields, such as the trip start date data-entry field 206 and the event start date data-entry field 304 of FIG. 3, though at this stage no data has yet been entered into these data-entry fields. The rendered form 200 is an example of a view (or rendering) of the data file 126. At this stage (unless the data file 126 had data input prior to its being transformed in the above blocks) the rendered form 200 would be blank, as shown in FIG. 2. Later in the process 400 the data-entry fields may contain data, such as shown in the rendered form 200 of FIG. 3. The data-entry fields shown are mappable to nodes of the data file 126, as discussed above.

In block 408, the user interface 124 enables a user to input data into the data-entry fields of a rendered form, such as the blank rendered form 200 of FIG. 2. The user may do so through the user-input device 106, which may include the keyboard 110, the other devices(s) 112, and the mouse 114. The user may, for example, enter "03/13/2002" into the trip start date data-entry field 206, shown in FIG. 3.

Once the user inputs data into a data-entry field, the system 100 retains or stores the data input into the data file node through its corresponding data-entry field (block 410). The data-entry field is mapped to a particular node of the data file 126, and so this data is either retained or stored in that node of the data file 126 or in another location that can later be accessed and associated with that node. In the ongoing example, the user inputs a date in the trip start date data-entry field 206, which is mapped to the trip start date node 204. The characters for this input, "03/13/2002", may be shown in the rendered form prior to the rendered form being updated to reflect the input. This data may be altered by the transformation file 128 once it is applied on this node of the data file 126, however, as will be discussed below.

Once the user has input the data and wishes either to go on to input data into another data-entry field (indicated by tabbing to the next data-entry field, for instance), wants the rendered form 200 to be updated to reflect the input (by request, for instance), or otherwise, the system 100 updates the rendered form 200.

Before updating the rendered form 200, the system 100 decides how to more efficiently update the rendered form 200.

Efficiently Transforming and/or Rendering a Change to a Data File

In block 412, the system 100 determines whether or not the node or its subtree corresponding to the data-entry field is isolatable. The system can do so simply by checking the result of block 402, where the hierarchical data processing engine determined this. If the data file node or its subtree is isolatable, the system proceeds along the "Yes" route to block 414 and then to block 416. If the data file node (or its subtree) is not isolatable, the system proceeds along the "No" route to block 418 and then to block 416.

In block 414, the system 100 (through the hierarchical data processing engine 122), having determined that the data file node or its subtree is isolatable, will run less than the entire transformation file on less than the entire data file. How much (if any) it will run is based on whether the node, when transformed by the transformation file 128, produces an isolatable change to the rendered form 200 or not, which will be discussed in greater detail below in FIGS. 5 and 6. In either case, the result can be a partial rendering file.

The result of this partial or zero transformation produces a partial rendering file that takes less time and resources for the system 100 to render (discussed in block 416 below) than a full rendering file to update a change to the data file 126. This further improves the user's editing experience because it often significantly reduces the amount of time that the system 100 needs to update the rendered form 200.

To implement the partial rendering file to update the rendered form 200 to reflect the change to the data file 126, the system 100 replaces the out-of-date parts of the current rendering file used to implement the current (out-of-date) rendered form 200 with the new, up-to-date partial rendering file.

If the system 100 has to execute an entirely new rendering file, the system 100 may take too long, thereby inhibiting the user's editing experience. Using a partial rendering file increases the speed and reduces the quantity of resources needed by the system 100, thereby improving the user's editing experience.

With a partial or no transformation and only a partial rendering file to execute, the system 100 often will be able to transform the data file 126 and render the change due to the transformation so fast that the user will not be aware that any process has been performed (except perhaps seeing an update to the rendered form). This enables the user to be able see an accurate depiction of the state of the data file 126 as the user is editing the data file 126.

In block 416, the system 100 performs a subprocess rendering the partial rendering file or another subprocess rendering a full rendering file (created in block 418). It does so to show change(s) made to the data file 126 caused by the user inputting data into data-entry fields and thus, nodes of the data file 126.

In discussion of block 414 above, the hierarchical data processing engine 122 produces a partial rendering file, which the system 100 executes instead of a part of the current rendering file that the system 100 is executing to produce the current rendered form 200. Using the ongoing example, assume a partial rendering file is produced by the hierarchical data processing engine 122 for data input into the trip start date data-entry field 206 (and thus the start date node 204). In this case, the system 100 may only need to execute a small piece of new rendering file-a part that produces the text "03/13/2002" in the trip start date data-entry field 206 and the event start date data-entry field 304, both of FIG. 3. This amount of partial rendering file may be rendered into the current rendered form 200 is significantly less time and with less resources that rendering an entirely new rendering file.

In one implementation, the system 100 ensures that the rendered form 200 is in complete sync or "live" with the current state of the data file 126. Thus, the user has an accurate depiction of the state of the data file 126, even when the user is continuing to edit the data file 126. In this implementation, the rendered form 200 is maintained in a state that it would be in just as if the rendered form 200 were recreated from scratch with a full transformation of the transformation file 128 on the full (updated) data file 126 and execution of the full (updated) rendering file 130. While this full reapplication of the transformation file 128 and a new rendering file would often be prohibitively time-consuming and resource-intensive, the above processes for speeding up transformations and rendering often is not. The hierarchical data processing engine 122 acts to so speed up the process of accurately viewing a changing data file 126, that the user can experience, in most cases, a instantaneous updating of the rendered form.

In some cases, as will be discussed in block 418 below, the system executes a full, new rendering file. This is done when the complexity of the rendering or the transformation is such that the hierarchical data processing engine 122 does so in order to ensure complete accuracy of the rendered form 200. It is done infrequently, however, so that the user's editing experience is as user-friendly as possible.

In block 418, the system performs one or two subprocesses if the node or its subtree is not isolatable In the first subprocess, it creates only a portion of a rendering file that reflects a particular change in the data file 126. In the second subprocess, it creates a new rendering file. The system can determine if the node or its subtree is isolatable simply by checking the result of block 412, where the hierarchical data processing engine 122 determined this.

Thus, in block 418 the system 100 executes a full transformation subprocess, producing either a full or partial rendering file. When the node of the data file 126 corresponding to the current data-entry field is not isolated (or partially isolated) by the hierarchical data processing engine 122, the system executes a full transformation. This full transformation involves applying the full transformation file 128 on the full data file 126 (which contains the new data). The interim result is a full rendering file 130, which may or may not be the final result.

The system 100 (with the hierarchical data processing engine 122) attempts to reduce the amount of the interim full (new) rendering file 130 needed to be executed by the user interface 124 in block 416. It does so in order to speed up the updating process for the user, as rendering a partial rendering file takes less time and resources than rendering a full rendering file. For clarity and ease of discussion, how it does so is set forth in FIGS. 7 and 8 below.

The process 400 involves the hierarchical data processing engine 122 in the context of transforming the data file 126 to produce the rendering file 130. Transformations performed by the hierarchical data processing engine 122, however, can also perform other actions and create other results. The hierarchical data processing engine 122 can, for instance, perform computations that make substantial changes to the data file 126.

Exemplary Technique for Determining if a Node or its Subtree is Isolatable

FIG. 5 shows a process 500 for determining whether nodes or subtrees of a data file are isolatable by analyzing a transformation file for the data file. The process 500 is an exemplary process for performing the block 402 of FIG. 4.

Determining if a particular node or subtree of the date file 126 is isolatable can be difficult. When a user inputs data into a node of the data file 126, for instance, the transformation file 128 may add new data-entry fields, change current data-entry fields, present options to the user, access an outside source for information (like a database), perform complex computations, and the like. In so doing, the nodes of the transformation file 128 correlating to the node of the data file 126 may have to access outside sources. These outside sources can be accessed by the transformation file 128 during the process of transforming the node of the data file 126. This accessing of outside sources may directly or indirectly cause other parts of the transformation file 128 to be executed that do not appear to correlate to the node of the data file 126. Thus, isolating particular parts of the transformation file 128 includes ensuring that the isolated parts are all that is needed to transform the node of the data file 126.

In block 502, the hierarchical data processing engine 122 determines, for a node of the data file 126, if possible inputs into that node require only a simple change to the rendered form. In this block the hierarchical data processing engine 122 assesses if the node is isolatable. Here the hierarchical data processing engine 122 extrapolates what will happen for possible inputs into the node in question. The node is question is isolatable if possible inputs into the node cause only a simple change to data-entry fields when the transformation file 128 is applied on the data file 126. A simple change, for example, is one in which data rendered in one data-entry field is the data input into the node.

An example of an isolatable node is the event start date node 204 of FIGS. 2 and 3. In this example, data input into this node 204 (through the trip start date data-entry field 206) causes only an isolatable change to two data-entry fields of the rendered form 200 of FIG. 3. Entering a date, such as the date "03/13/2002" causes only the data input "03/13/2002" to be stored in the event start date node 204 (and not in another node of the data file 126) and be viewed only in two data-entry fields, the trip start date data-entry field 206 and the event start date data-entry field 304. Thus, the change made to the rendering file is, when executed, rendered in the rendered form 200 to show these characters in these two data-entry fields.

Also, because no other node of the data file 126 is affected by the input into the event start date node 204, no transformation is needed (if the data input is stored in the data file 126 when entered). In this way the hierarchical data processing engine 122 increases the speed and efficiency of rendering changes to the data file 126 in the rendered form 200 because it alleviates the system 100 from needing to apply even a part of the transformation file 128 on the data file 126. The system 100 also does not need to create a full rendering file. The amount of rendering file used is that amount that will allow the system 100 to show the characters "03/13/2002" in those two data-entry fields.

In one implementation, the hierarchical data processing engine 122 determines if a node is isolatable by determining that 1) for parts of the transformation file 128 that are executed for the node in question, there are no non-predictable variables; 2) there is no need to include or import operations or code from outside these parts of the transformation file 128; and 3) mapping expressions between the parts of the transformation file 128 and the node of the data file 126 do not include complex functions or expressions.

In block 504, the hierarchical data processing engine 122 proceeds along the "Yes" path to block 506 if the node is isolatable, and along the "No" path to block 508 if it is not isolatable.

In block 506 the hierarchical data processing engine 122 records that the node in question is isolatable. This record of the status of the node can be used by the hierarchical data processing engine 122 or the system 100 to determine how to render a change to this node. This record can also include information instructing the hierarchical data processing engine 122 as to which element(s) of a potential rendering file should be changed for an input to this node.

In block 508, the hierarchical data processing engine 122 determines whether the subtree is isolatable. The hierarchical data processing engine 122 does so by determining if a subtree of the transformation file 128 is sufficient to accurately transform and render a change to the data file node.

The hierarchical data processing engine 122 can do so by comparing rendering files for potential changes to the node. These compared rendering files include those created by performing a full transformation 128 on the full data file 126 and a subtree of the transformation file 128 on a subtree of the data file 126. If the result of this comparison shows that applying the subtree of the transformation file 128 on the subtree of the data file 126 produces the same change in the rendering file 130 as a full transformation does versus the version without the node changed, it may be isolatable.

For example, assume that data input into the event start date data-entry field 304 is stored in the event start date node 302. Assume also that another piece of the hierarchical data processing engine 122 modifies the data file 126 such that an event end date node 310 is transformed to include the next calendar day following the date input into the event start date node 302. Also, that the full rendering file 130 shows this change to the event end date node 310 in an event end date data-entry field 312. Thus, in this example the full application of the transformation file 128 on the full data file 126 produces a change to the rendered form 200 of FIG. 3 of "03/13/2002" in the event start date data-entry field 304 and "03/14/2002" in the event end date data-entry field 312. This change is shown for clarity, but a particular input into the node in question is not needed for the hierarchical data processing engine 122 to analyze whether the subtree is isolatable.

Continuing the example, the question remains whether or not a subtree of the transformation file 128 when applied to a subtree including the node in question will produce the same change in the data file 126 and the rendering file 130. Here the hierarchical data processing engine 122 analyzes the event subtree 308 and a subtree in the transformation file 128 correlating to the event subtree 308. In this case assume that the hierarchical data processing engine 122 determines that the only change made to the data file 126 was rendering the date input into the event start date node 302 and adding the next day to the event end date node 310 and its corresponding rendering. The renderings in this example comprise the "03/13/2002" in the event start date data-entry field 304 and the "03/14/2002" in the event end date data-entry field 312.

To test the accuracy of the partial transformation file 128 applied to the partial data file 126 (both subtrees), the hierarchical data processing engine 122 applies the transformation file 128 to the data file 126. The hierarchical data processing engine 122, if it determines that the resulting change to the data file 126 is the same, as is the change to the rendering file 130, the hierarchical data processing engine 122 will consider it isolatable for those subtrees.

Applying a part of the transformation file 128 on a part of the data file 126 is quicker and more efficient than apply the whole transformation file 128 on the whole data file 126. In this example, the event subtree 308 could include applying many nodes of the transformation file 128 on many nodes of the data file 126, but this would still take less time and resources than a full reapply. Also, the result of this partial reapply is a much smaller rendering file to be rendered. Executing a part of the rendering file 130 (the new part) can take significantly less time and resources than executing the entire rendering file 130.

In one implementation, determining whether the subtree of each of the data file 126 and the transformation file 128 is isolatable includes determining that there are no references in the transformation file 128 subtree to nodes of the data file 126 outside of the data file 126's subtree for the node in question.

In this implementation, the hierarchical data processing engine 122 records the subtree in question as isolatable if no mapping expressions (such as XPaths) in the subtrees of the transformation file 128 and the data file 126 refer to nodes outside of these subtrees.

Also in this implementation, the hierarchical data processing engine 122 records the subtree in question as isolatable if also there are no calls to apply templates inside the subtrees and the data file 126 subtree does not contain any nested subtrees.

In another implementation, the hierarchical data processing engine 122 determines if a subtree is isolatable by determining that 1) for parts of the transformation file 128 that are executed for the node in question, there are no non-predictable variables; 2) there is no need to include or import operations or code from outside these parts of the transformation file 128; and 3) mapping expressions between the parts of the transformation file 128 and the node of the data file 126 do not include complex functions or expressions.

The hierarchical data processing engine 122 can continue to test the transformation file 128 subtrees (smaller ones if the current subtree is isolatable, larger if it is not) to determine a subtree that is isolatable for the data file 126 node in question. Once the hierarchical data processing engine 122 determines whether there are subtrees in the data file 126 and the transformation file 128 for the node in question (and what they are), the hierarchical data processing engine 122 can proceed to the next block, block 510.

In block 510, the hierarchical data processing engine 122 proceeds along the "Yes" path to block 512 if the subtree is isolatable, and along the "No" path to block 514 if it is not.

In block 512 the hierarchical data processing engine 122 records that the subtree in question is isolatable. In so doing, it can also record the location of the subtrees for the transformation file 128 and the data file 126. Also, it can record how a partial rendering file created with this partial transformation maps to parts of a rendering file that the new partial rendering file is to replace. This record of the status (and other information therein) of the node can be used by the hierarchical data processing engine 122 or the system 100 to determine how to transform and render a change to this node.

In block 514 the hierarchical data processing engine 122 records that the node in question is not isolatable. In one implementation, the hierarchical data processing engine 122 records that the node in question is not suitable for a partial rendering due to the complexity of the rendering needed. This information can be used by the hierarchical data processing engine 122 or the system 100 when deciding whether or not to analyze whether or not a change to the node can be partially rendered.

Exemplary Technique for Executing an Isolation Subprocess

Figure 6:
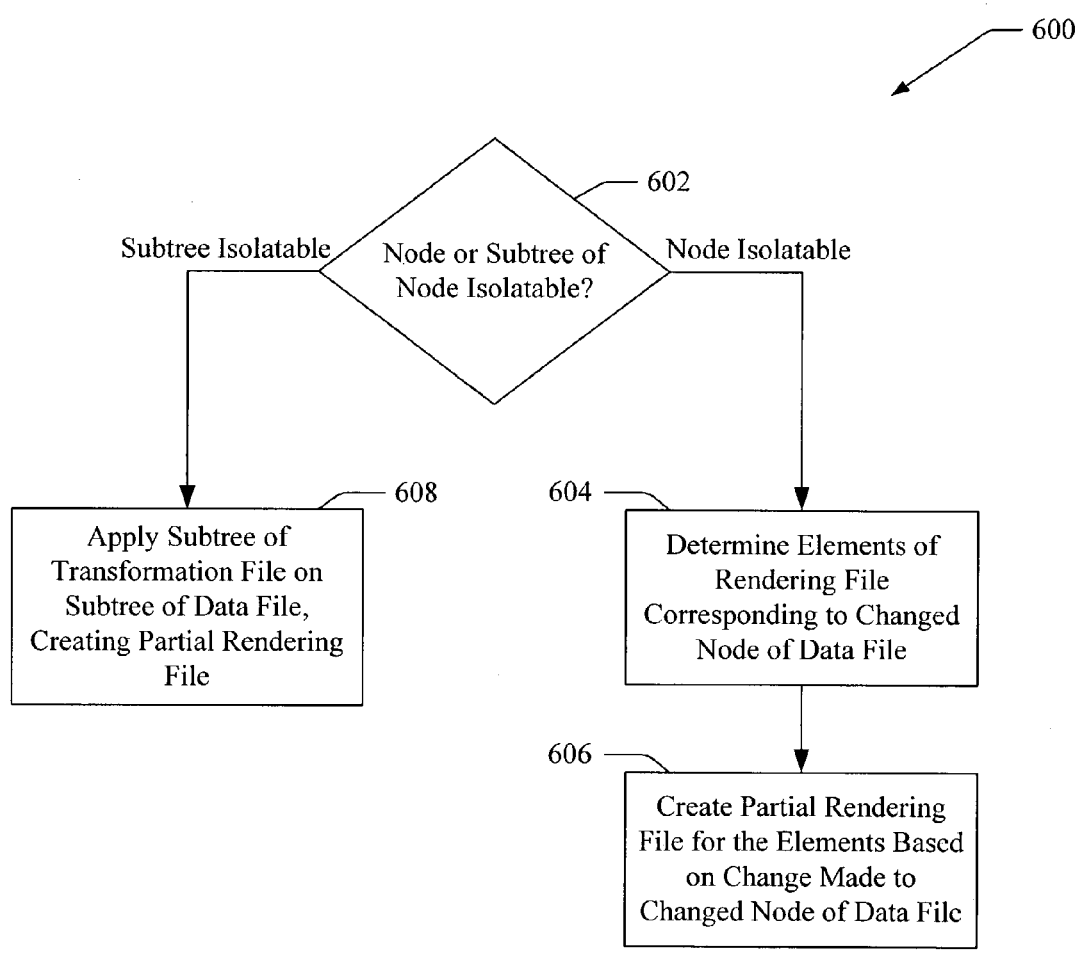
FIG. 6 is a flow diagram of an exemplary process for executing isolation subprocesses for creating a partial rendering file.

FIG. 6 shows a process 600 for executing one of multiple isolation subprocesses. The process 600 is an exemplary process for performing the block 414 of FIG. 4.

In block 602, the hierarchical data processing engine 122 accesses a record for the node receiving the input. This record is one created by the hierarchical data processing engine 122 as part of block 402. This record shows that the node is isolatable or its subtree is isolatable. If the node is isolatable, the hierarchical data processing engine 122 proceeds along the "Node Isolatable" path to blocks 604 and 606. If the node is not isolatable but the subtree is, it proceeds along the "Subtree Isolatable" path to block 608.

In block 604, the hierarchical data processing engine 122 determines which elements of the current rendering file correspond to changes made to the node of the data file 126. In the isolatable-node case, application of the transformation file 128 is not needed. Rather, the hierarchical data processing engine 122 simply determines which areas (elements), such as data-entry fields, of the current rendered form are to be altered with the characters input into the node in question. To do so, the hierarchical data processing engine 122 determines which particular elements of the current rendering file 130 need to be changed. This information can be accessed from the record for the node created by the hierarchical data processing engine 122 in block 402, or determined in a like manner as that set forth in block 402.

For each node causing an isolatable change to the rendering file 130 by the node changing, the hierarchical data processing engine 122 maps to it those elements of the rendering file 130 that render the input made to that node.

The characters, text, rich text, and the like that are input into the node are built into a partial rendering file (block 606). This partial rendering file, when executed by the user interface 124, replaces the elements of the current rendered form that are out-of-date with the data input into the node.

In one implementation, another application shows text as it is typed into the data-entry field. In this case, the system 100 verifies that this text shown in the data-entry field matches what would be rendered from a partial rendering file, rather than executing the partial rendering file.

The elements changed can be simple, such as a very small (and partial) rendering file containing rendering code indicating, for instance, that the characters "03/13/2002" should be rendered in two data-entry fields of the current rendered form (such as the rendered form 200 of FIG. 2).

Because of the speed and resource savings of not having to perform a full transformation (or any transformation) and rendering just a small, partial rendering file, the user's editing experience is sped up and made more user friendly. The user experiences an incremental, accurate, and quick updating of the rendered form for the data file 126.

At block 608, the hierarchical data processing engine 122 applies a subtree of the transformation file 128 on a subtree of the data file 126. The location of these subtrees (within the full files) is set forth in a record previously made by the hierarchical data processing engine 122 in block 402. This record maps subtrees of the transformation file 128, the data file 126, and the rendering file 130 to each other. With this information, the hierarchical data processing engine 122 applies the subtree of the transformation file 128 on the subtree of the data file 126 for the node that was changed. The result of this application is a partial rendering file, which maps to a subtree of the current rendering file 130, allowing the user interface 124 to replace the subtree of the current rendering file 130 with this partial rendering file.

Thus, the result of this partial reapply is a partial rendering file. This partial rendering file is later executed by the user interface in place of the out-of-date rendering portion of the current rendering file 130.

Technique for Producing a Partial Rendering File from a Full Transformation

Figure 7:
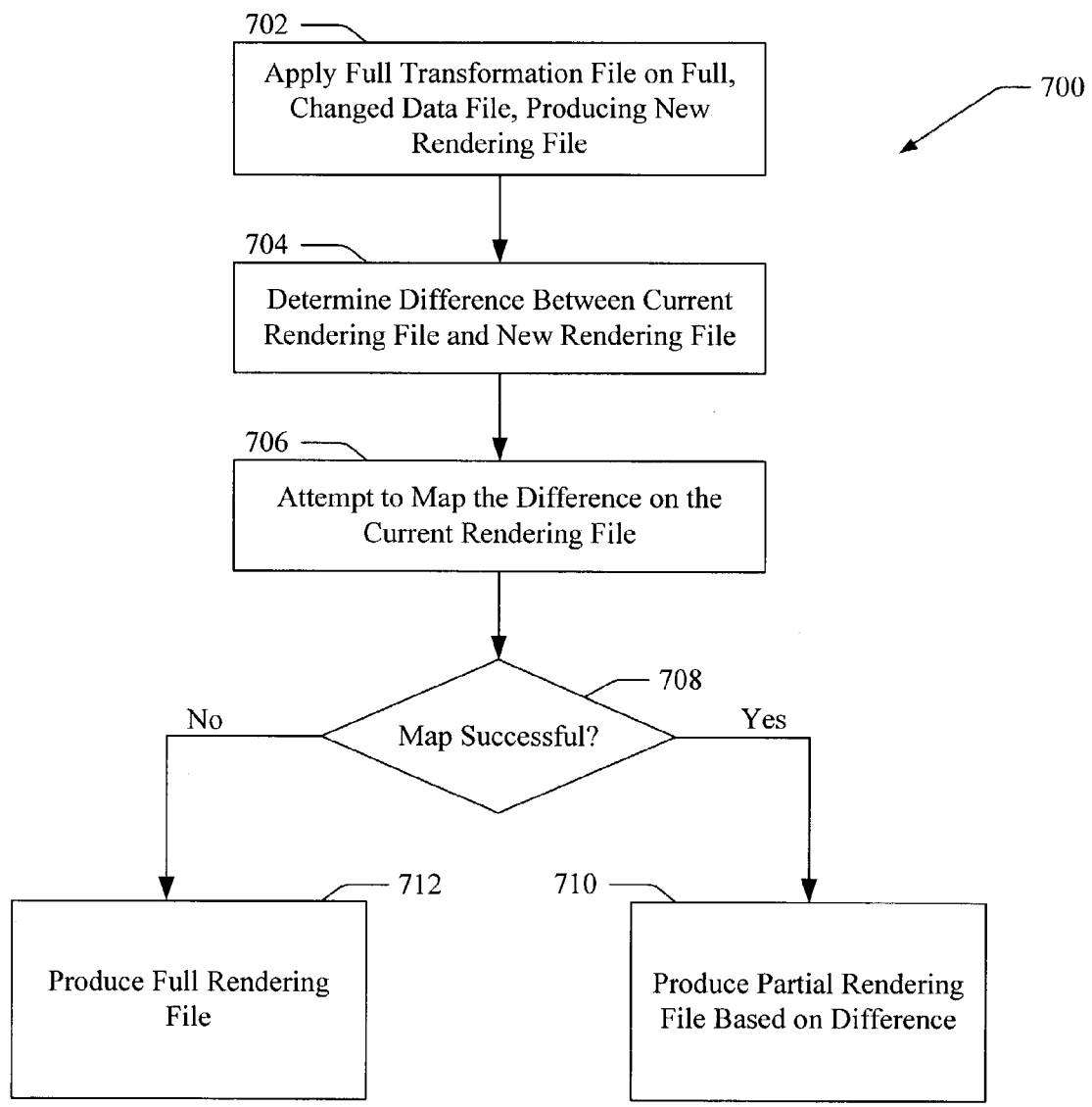
FIG. 7 is a flow diagram of an exemplary process for executing full transformation subprocesses.

FIG. 7 shows a process 700 for creating a partial rendering file from a difference between a new and a current rendering file. The process 700 is an exemplary process for performing the block 418 of FIG. 4.

At block 702, the hierarchical data processing engine 122 applies a full transformation file on a full, changed data file (the data file 126 after a transformation is applied to the data file 126 with a node changed) to produce a new rendering file. This new rendering file is an interim file, which may or may not be executed. It is also up-to-date, containing change(s) caused by the input into the node. The system 100 could simply execute this new, up-to-date rendering file to create an up-to-date rendered form. Doing so, however, is often prohibitively slow. Executing that part of the up-to-date rendering file that is different from the current, out-of-date rendering file requires less time and fewer resources.

To reduce the amount of a new rendering file that is executed to view a change to the data file 126, the hierarchical data processing engine 122 determines the difference between the current rendering file and the new rendering file (block 704). This difference is a part(s) of the new rendering file that, when executed, will present a rendering of the change to the current data file 126.

This difference can be determined by performing a hierarchical differential analysis, which though correct, is less efficient than a linear analysis. This analysis compares the new and current rendering files and produces a result showing the difference. This can also be determined by a linear analysis, which is set forth in greater detail in the exemplary process set forth in FIG. 8 and discussed below.

At block 706, the hierarchical data processing engine 122 attempts to map the difference on the current rendering file 130. By so doing, the hierarchical data processing engine 122 attempts to map up-to-date parts of the new rendering file to those parts of the current rendering file 130 that are to be replaced by the new parts. That way, when the system 100 attempts to reflect the change to the data file 126, the system 100 will have less new code to render. This reduction can speed up the process of rendering changes to the data file 126, improving the editing experience of the user.

This mapping can include instructions describing what parts of the current, out-of-date rendering file 130 are to be replaced with the difference. These mapping instructions can be included with the difference within a partial rendering file.

To ensure that the difference is properly mapped to the out-of-date parts of the rendering file 130, the hierarchical data processing engine 122 tests the mapping instructions (block 708). If the mapping instructions accurately describe what parts of the current rendering file 130 are to be replaced to accurately render the change to the data file 126, the hierarchical data processing engine 122 proceeds along the "Yes" path to block 710. If they do not, the hierarchical data processing engine 122 proceeds along the "No" path to block 712.

If the mapping is successful, the hierarchical data processing engine 122 produces a partial rendering file based on the difference (block 710). This partial rendering file includes the new, up-to-date part of the new rendering file that the system 100 (through the user interface 124) can execute to render the change to the data file 126. This partial rendering file can also include mapping instructions showing those parts of the current data file 126 that are inaccurate or not necessary to execute. With these mapping instructions, the current rendered form can be made up-to-date through execution of a partial, rather than full, rendering file (block 416 of FIG. 4).

If the mapping is not successful, the hierarchical data processing engine 122 simply produces the new, full rendering file (block 712). Executing this new, full rendering file often takes substantially more time and resources to execute than a partial rendering file. This operation is included, however, as a fail-safe to insure that the rendered form accurately reflects the change in the data file 126.

Exemplary Technique for Determining a Difference between Two Rendering Files

Figure 8:
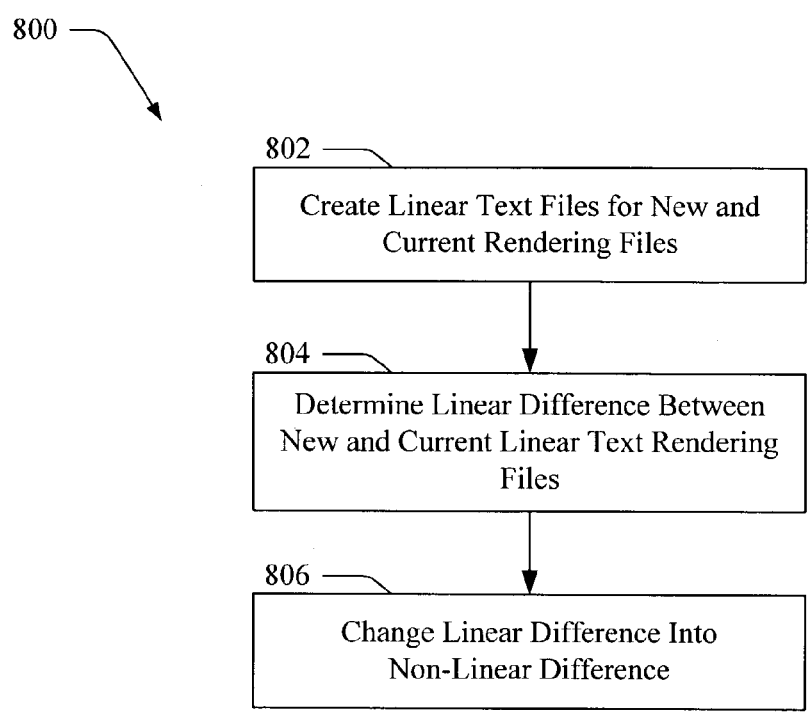
FIG. 8 is a flow diagram of an exemplary process for determining a difference between a current rendering file for an unchanged data file and a new rendering file for a changed data file.

FIG. 8 shows a process 800 for determining the difference between a new and a current rendering file. The process 800 is an exemplary process for performing the block 704 of FIG. 7.

In block 802, the hierarchical data processing engine 122 creates linear text files for the new and current rendering files. By creating a linear, rather than hierarchical or otherwise structured file, the hierarchical data processing engine 122 can more easily compare the new and current rendering files.

In block 804, the hierarchical data processing engine 122 determines the linear difference between the linear text files for the new and current rendering files. This determination can be much quicker to execute and require fewer resources than a non-linear analysis, thereby further speeding up and improving the user's editing experience. This linear difference is a linear text file which is not, on its own, executable in the same way as the original, non-linear rendering file (such as the rendering file 130).

In block 806, the hierarchical data processing engine 122 converts this linear difference file into a non-linear difference, possibly increasing the scope of the difference. This difference is a hierarchical file of a structure similar to the structure of the new and current rendering files. In one implementation this difference represents differences between rendering files that are arranged into a tree structure.

While the hierarchical data processing engine 122 creates linear files and then converts another linear difference file to a structured file, the time and resources to do so is often more than compensated for by the reduced time of executing a linear, rather than non-linear comparison, thereby more quickly updating a change to the rendered form.

A Computer System

Figure 9:
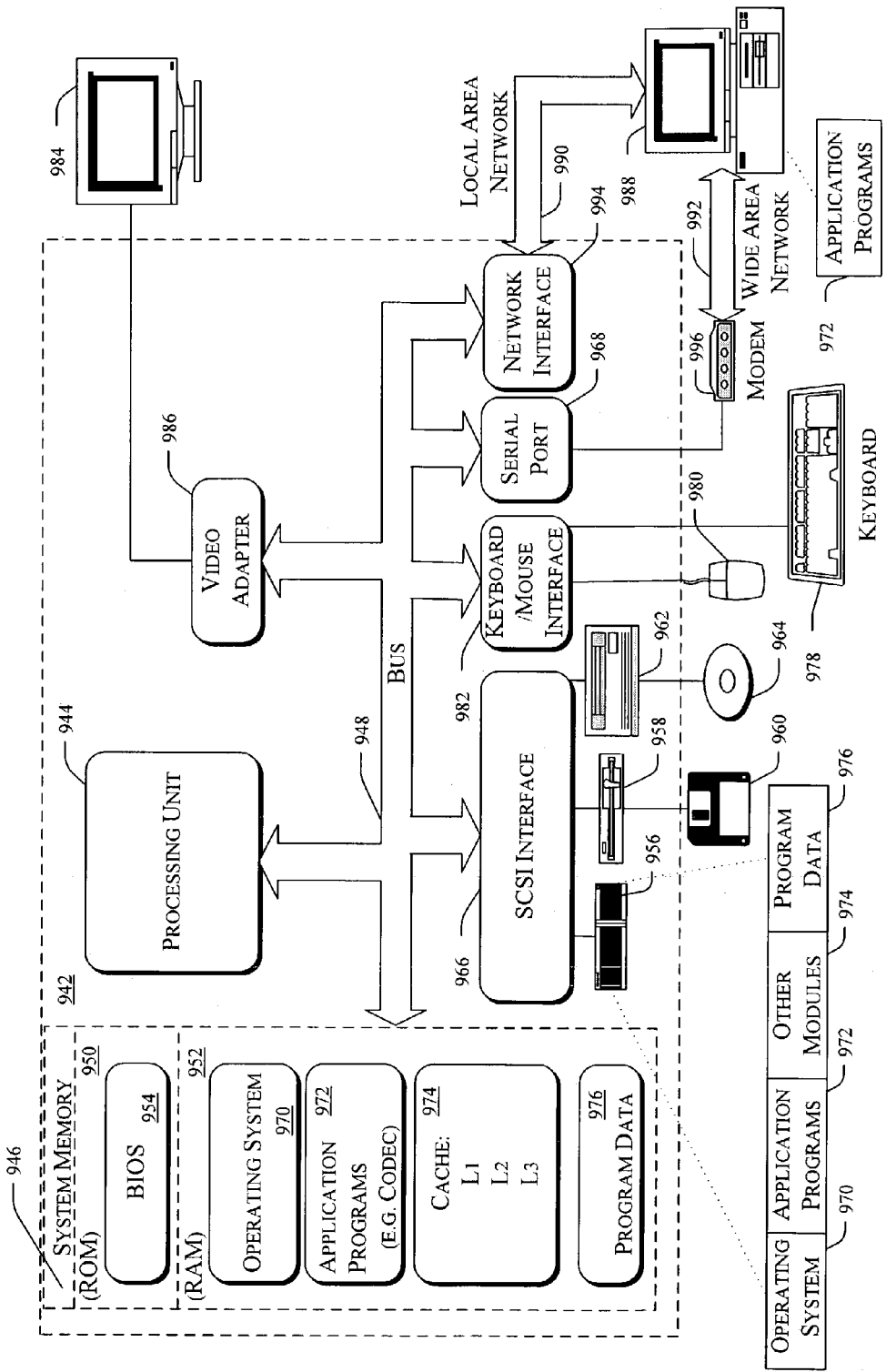
FIG. 9 is a block diagram of a computer system that is capable of supporting incremental transformation and rendering of hierarchical data files.

FIG. 9 shows an exemplary computer system that can be used to implement the processes described herein. Computer 942 includes one or more processors or processing units 944, a system memory 946, and a bus 948 that couples various system components including the system memory 946 to processors 944. The bus 948 represents one or more of any of several types of bus structures, including a memory bus or memory controller, a peripheral bus, an accelerated graphics port, and a processor or local bus using any of a variety of bus architectures. The system memory 946 includes read only memory (ROM) 950 and random access memory (RAM) 952. A basic input/output system (BIOS) 954, containing the basic routines that help to transfer information between elements within computer 942, such as during start-up, is stored in ROM 950.

Computer 942 further includes a hard disk drive 956 for reading from and writing to a hard disk (not shown), a magnetic disk drive 958 for reading from and writing to a removable magnetic disk 960, and an optical disk drive 962 for reading from or writing to a removable optical disk 964 such as a CD ROM or other optical media. The hard disk drive 956, magnetic disk drive 958, and optical disk drive 962 are connected to the bus 948 by an SCSI interface 966 or some other appropriate interface. The drives and their associated computer-readable media provide nonvolatile storage of computer-readable instructions, data structures, program modules and other data for computer 942. Although the exemplary environment described herein employs a hard disk, a removable magnetic disk 960 and a removable optical disk 964, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 956, magnetic disk 960, optical disk 964, ROM 950, or RAM 952, including an operating system 970, one or more application programs 972 (such as the hierarchical data processing engine application 122), other program modules 974, and program data 976. A user may enter commands and information into computer 942 through input devices such as a keyboard 978 and a pointing device 980. Other input devices (not shown) may include a microphone, joystick, game pad, satellite dish, scanner, or the like. These and other input devices are connected to the processing unit 944 through an interface 982 that is coupled to the bus 948. A monitor 984 or other type of display device is also connected to the bus 948 via an interface, such as a video adapter 986. In addition to the monitor, personal computers typically include other peripheral output devices (not shown) such as speakers and printers.

Computer 942 commonly operates in a networked environment using logical connections to one or more remote computers, such as a remote computer 988. The remote computer 988 may be another personal computer, a server, a router, a network PC, a peer device or other common network node, and typically includes many or all of the elements described above relative to computer 942. The logical connections depicted in FIG. 9 include a local area network (LAN) 990 land a wide area network (WAN) 992. Such networking environments are commonplace in offices, enterprise-wide computer networks, intranets, and the Internet.

When used in a LAN networking environment, computer 942 is connected to the local network through a network interface or adapter 994. When used in a WAN networking environment, computer 942 typically includes a modem 996 or other means for establishing communications over the wide area network 992, such as the Internet. The modem 996, which may be internal or external, is connected to the bus 948 via a serial port interface 968. In a networked environment, program modules depicted relative to the personal computer 942, or portions thereof, may be stored in the remote memory storage device. It will be appreciated that the network connections shown are exemplary and other means of establishing a communications link between the computers may be used.

Generally, the data processors of computer 942 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the blocks described below in conjunction with a microprocessor or other data processor. The invention also includes the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

The above-described system and method incrementally transforms and/or renders hierarchical data files. In so doing, it improves the editing experience for a user editing a hierarchical data file by more quickly and with less resources rendering incremental changes made to the data file. Although the system and method have been described in language specific to structural features and/or methodological acts, it is to be understood that the system and method defined in the appended claims is not necessarily limited to the specific features or acts described. Rather, the specific features and acts are disclosed as exemplary forms of implementing the claimed invention.

The invention claimed is:

1. A computer-readable medium comprising computer-executable instructions that perform the following when executed by a computer:
   producing a first rendering file of a hierarchical data file by applying a full transformation file on the hierarchical data file;
   rendering the first rendering file to show a rendered form;
   enabling a user to input data into a first node of the hierarchical data file through the rendered form;
   changing the hierarchical data file by retaining the data in the first node of the hierarchical data file;
   determining whether applying a partial transformation file on the changed hierarchical data file will produce a third rendering file equivalent to a difference between the first rendering file and a second rendering file created by applying the full transformation file on the changed hierarchical data file;
   applying a partial transformation file on the changed hierarchical data file responsive to determining that applying a partial transformation file on the changed hierarchical data file will produce a third rendering file equivalent to the difference; and
   enabling the user to input data into a second node of the hierarchical data file.

2. The computer-readable medium of claim 1, wherein the applying a partial transformation file on the changed hierarchical data file responsive to determining that applying a partial transformation file on the changed hierarchical data file will produce a third rendering file equivalent to the difference, is performed on only a portion of the changed hierarchical data file.

3. The computer-readable medium of claim 1, wherein the applying a partial transformation file on the changed hierarchical data file responsive to determining that applying a partial transformation file on the changed hierarchical data file will produce a third rendering file equivalent to the difference, is performed prior to the enabling the user to input data into the second node.

4. The computer-readable medium of claim 1, wherein the hierarchical data file is written in XML and the transformation file is written in XSLT.

5. The computer-readable medium of claim 1, wherein the applying a partial transformation file on the changed hierarchical data file responsive to determining that applying a partial transformation file on the changed hierarchical data file will produce a third rendering file equivalent to the difference, produces a rendering file and further comprising rendering the rendering file to produce a rendered form having first and second data-entry fields corresponding to the first node and the second node.

6. The computer-readable medium of claim 1, wherein the applying a partial transformation file on the changed hierarchical data file responsive to determining that applying a partial transformation file on the changed hierarchical data file will produce a third rendering file equivalent to the difference, produces a partial rendering file and further comprising rendering the partial rendering file to produce a partial rendered form having a first data-entry field corresponding to the first node.

7. The computer-readable medium of claim 1, wherein the applying a partial transformation file on the changed hierarchical data file responsive to determining that applying a partial transformation file on the changed hierarchical data file will produce a third rendering file equivalent to the difference, produces a partial rendering file and further comprising rendering the partial rendering file to produce a partial rendered form that represents the change made to the hierarchical data file.

8. The computer-readable medium claim 1, wherein the applying a partial transformation file on the changed hierarchical data file responsive to determining that applying a partial transformation file on the changed hierarchical data file will produce a third rendering file equivalent to the difference, produces a partial rendering file written in XHTML, and further comprising rendering the partial rendering file to produce a partial rendered form written in XHTML that represents the change made to the hierarchical data file.

9. A computer-readable medium comprising computer-executable instructions that perform the following when executed by a computer:
   applying a transformation file on a hierarchical data file to produce a first rendering file;
   rendering the first rendering file to produce a rendered form;
   enabling a user to input data into a first node of the hierarchical data file through the rendered form;
   changing the hierarchical data file by retaining the data in the first node of the hierarchical data file;
   applying the transformation file on the changed hierarchical data file to produce a second rendering file;
   determining a difference between the first rendering file and the second rendering file;
   attempting to map the difference on the first rendering file;
   producing a third rendering file, the third rendering file comprising a partial rendering file based on the difference if the map is successful and comprising a full rendering file if the map is not successful;
   rendering the third rendering file to update the rendered form; and
   enabling the user to input data into a second node of the hierarchical data file through the updated rendered form.

10. The computer-readable medium of claim 9, wherein the applying the transformation file on the changed hierarchical data file is performed on only a portion of the changed hierarchical data file.

11. The computer-readable medium of claim 9, wherein the applying the transformation file on the changed hierarchical data file is performed immediately after the data is input and retained.

12. The computer-readable medium of claim 9, wherein the applying the transformation file on the changed hierarchical data file is performed prior to the enabling the user to input data into the second node.

13. The computer-readable medium of claim 9, wherein the hierarchical data file is written in XML and the transformation file is written in XSLT.

14. A method comprising:
producing a first rendering file of a hierarchical data file having first and second nodes by applying a full transformation file on the hierarchical data file;
rendering the first rendering file to show a rendered form having a first data-entry field associated with the first node of the hierarchical data file and a second data-entry field associated with the second node of the hierarchical data file;
enabling a user to input data into the first data-entry field;
changing the hierarchical data file by retaining the data in the first node of the hierarchical data file;
determining whether applying a partial transformation file on the changed hierarchical data file will produce a rendering file equivalent to a difference between the first rendering file and a second rendering file created by applying the full transformation on the changed hierarchical data file;
producing a third rendering file of the changed hierarchical data file, the third rendering file comprising a partial rendering file based on the difference if it is determined that applying a partial transformation file on the changed hierarchical data file will produce a rendering file equivalent to the difference and the third rendering file comprising a full rendering file if it is determined that applying a partial transformation file on the changed hierarchical data file will not produce a rendering file equivalent to the difference;
rendering the third rendering file to show a second rendered form reflecting the change to the hierarchical data file; and
enabling the user to input data into the second data-entry field.

15. The method of claim 14, wherein the producing the third rendering file and the rendering the third rendering file is imperceptible to the user.

16. The method of claim 14, wherein the first, second, and third rendering files are written in XHTML.

17. The method of claim 14, wherein the hierarchical data file is written in XML.

18. A computer-readable medium comprising computer-executable instructions that perform the method of claim 14 when executed by a computer.

19. A method comprising:
applying a transformation file on a hierarchical data file having first and second nodes to produce a first rendering file;
rendering the first rendering file to show a rendered form having a first data-entry field associated with the first node of the hierarchical data file and a second data-entry field associated with the second node of the hierarchical data file;
enabling a user to input data into the first data-entry field;
changing the hierarchical data file by retaining the data in the first node of the hierarchical data file;
applying the transformation file on the changed hierarchical data file to produce a second rendering file;
determining a difference between the first rendering file and the second rendering file;
attempting to map the difference on the first rendering file;
producing a third rendering file, the third rendering file comprising a partial rendering file based on the difference if the map is successful and comprising a full rendering file if the map is not successful;
rendering the third rendering file to show a second rendered form reflecting the change to the hierarchical data file; and
enabling the user to input data into the second data-entry field.

20. The method of claim 19, wherein the act of applying the transformation file on the changed hierarchical data file to produce a second rendering file is imperceptible to the user.

21. The method of claim 19, wherein the first, second, and third rendering files are written in XHTML.

22. The method of claim 19, wherein the hierarchical data file is written in XML.

23. The method of claim 19, wherein the transformation file is written in XSLT.

24. A computer-readable medium comprising computer-executable instructions that perform the method of claim 19 when executed by a computer.

25. A method comprising:
producing a first rendering file of a hierarchical data file;
changing a node of the hierarchical data file, thereby making a part of the first rendering file out-of-date with respect to the changed node of the hierarchical data file;
producing an interim rendering file by applying an XSLT transformation file on the changed hierarchical data file;
determining a difference between the interim rendering file and the first rendering file;
attempting to map the difference to the out-of-date part of the first rendering file; and
producing a partial rendering file based on the difference if the map is successful and producing a full rendering file if the map is not successful.

26. The method of claim 25, wherein producing the partial rendering file is performed by applying part of the XSLT transformation file on a subtree of nodes including the changed node of the hierarchical data file.

27. The method of claim 25, wherein producing the partial rendering file is performed by applying a subtree of the XSLT transformation file on a corresponding subtree of nodes including the changed node of the hierarchical data file.

28. The method of claim 25, wherein the hierarchical data file is written in XML and the first, interim, partial, and full rendering files are written in XHTML.

29. A computer-readable medium comprising computer-executable instructions that perform the method of claim 25 when executed by a computer.

30. A method comprising:
analyzing a subtree of transformation-file nodes of a transformation file to determine if a hierarchical data file can be accurately transformed for possible changes to a data-file node of the hierarchical data file by applying the subtree of transformation-file nodes on a subtree of data-file nodes including the data-file node;
changing data in the data file node of the hierarchical data file; and
transforming the subtree of data-file nodes including the data-file node by applying the subtree of transformation-file nodes on the subtree of data-file nodes including the data-file node, wherein the transforming the subtree of the data-file nodes produces a second rendering file identical to a difference between a first rendering file produced by applying all of the transformation file on all of the hierarchical data file before the change to the data-file node and a third rendering file produced by applying all of the transformation file on all of the hierarchical data file after the change to the data-file node.

31. The method of claim 30, wherein the transforming the subtree of the data-file nodes produces a resulting change to the hierarchical data file identical to a change produced by applying all of the transformation file on all of the hierarchical data file.

32. The method of claim 30, wherein the hierarchical data file is written in XML and the transformation file is written in XSLT.

33. A computer-readable medium comprising computer-executable instructions that perform the method of claim 30 when executed by a computer.

34. A method comprising:
applying a full transformation file on a hierarchical data file containing a node, thereby producing a first rendering file;
determining one or more elements of the rendering file that can change for possible changes of the node;
changing the hierarchical data file by changing the node;
creating a second rendering file by applying a full transformation file on the changed hierarchical data file;
determining a difference between the first rendering file and the second rendering file;
attempting to map the difference on the first rendering file; and
producing a third rendering file, the third rendering file comprising a partial rendering file based on the difference if the map is successful and comprising a full rendering file if the map is not successful.

35. The method of claim 34, further comprising:
rendering the first rendering file to create a rendered form having a data-entry field corresponding to the node of the hierarchical data file;
receiving data input into the node through the data-entry field; and
rendering the third rendering file to change the data-entry field of the rendered form to show the data.

36. The method of claim 34, wherein the first rendering file is written in XHTML and the hierarchical data file is written in XML.

37. A computer-readable medium comprising computer-executable instructions that perform the method of claim 34 when executed by a computer.

38. A method comprising:
applying a transformation file on a hierarchical data file containing a node to produce a first result;
applying a transformation file subtree of the transformation file on a data file subtree containing the node of the hierarchical data file for a range of possible changes to the node to produce a second result;
applying the transformation file on the hierarchical data file with the node having the range of possible changes to produce a third result;
determining if the first result in conjunction with the second result is equal to the third result; and
recording the data file subtree of the hierarchical data file to be isolatable if the determining is true.

39. The method of claim 38, wherein the first result, second result, and third result are rendering files.

40. The method of claim 38, wherein the first result, second result, and third result are rendered forms.

41. A computer-readable medium comprising computer-executable instructions that perform the method of claim 38 when executed by a computer.

42. A method comprising:
determining, for a change to a node of a hierarchical data file subtree, whether applying a partial transformation file subtree corresponding to the hierarchical data file subtree will produce a third rendering file equivalent to a difference between a first rendering file created by applying a full transformation file on a full hierarchical data file prior to the change to the node and a second rendering file created by applying the full transformation file on the full hierarchical data file after the change to the node; and
producing the third rendering file by applying a partial transformation file when it is determined that applying a partial transformation file on the changed hierarchical data file will produce a third rendering file equivalent to the difference.

43. The method of claim 42, wherein the determining includes finding that there are no references in the partial transformation file subtree to parts outside of those subtrees.

44. The method of claim 42, wherein the determining includes finding that there are no methods in the partial transformation file subtree or the hierarchical data file subtree to perform actions other than those performed by applying the partial transformation file subtree.

45. The method of claim 42, wherein the determining includes finding that there are no nested subtrees within the partial transformation file subtree or the hierarchical data file subtree.

46. A method comprising:
applying a transformation file on a hierarchical data file containing a node, thereby producing a first rendering file;
changing data within the node, thereby changing the hierarchical data file;
applying the transformation file on the changed hierarchical data file thereby producing a second rendering file;
determining a difference between the first rendering file and the second rendering file; and
integrating the difference into the first rendering file to produce a third rendering file equal to the second rendering file.

47. The method of claim 46, wherein the determining is performed by comparing the first rendering file and the second rendering file while those files are arranged in a non-linear structure.

48. The method of claim 46, wherein the determining is performed by comparing the first rendering file and the second rendering file while those files are arranged in a linear structure.

49. The method of claim 46, wherein the determining is performed by:
creating a first linear text file of the first rendering file;
creating a second linear text file of the second rendering file;
comparing the first linear text file with the second linear text file to produce a linear difference between the first and second text files;
and converting the linear difference into a hierarchical difference.

50. The method of claim 46, wherein the difference is a difference rendering file of shorter length than the second rendering file.

51. The method of claim 46, wherein the determining includes mapping the difference to portions of the first rendering file that are out-of-date and the integrating includes using the mapping to replace the out-of-date portions of the first rendering file with the difference.

52. A computer-readable medium comprising computer-executable instructions that perform the method of claim 46 when executed by a computer.

53. An apparatus comprising:
means for producing a first rendering file of a hierarchical data file;
means for rendering the first rendering file to show a rendered form;

means for enabling a user to input data into a first node of the hierarchical data file;

means for storing the data in the first node of the hierarchical data file;

means for determining whether applying a partial transformation file on the hierarchical data file after data is stored in the first node file will produce a third rendering file equivalent to a difference between the first rendering file and a second rendering file created by applying a full transformation file on the changed hierarchical data file after data is stored in the first node;

means for applying a partial transformation file on the hierarchical data file after data is stored in the first node to produce the third rendering file when it is determined that applying a partial transformation file on the changed hierarchical data file will produce a third rendering file equivalent to the difference;

means for accurately viewing the change in the hierarchical data file in the rendered form by rendering the third rendering file; and means for enabling the user to input data into a second node of the hierarchical data file.

* * * * *